(12) United States Patent
Hsu et al.

(10) Patent No.: US 9,167,592 B1
(45) Date of Patent: Oct. 20, 2015

(54) SIGNALING RADIO BEARER TIMER FOR DUAL-SIM DUAL-ACTIVE USER EQUIPMENT TRANSMITTER SHARING

(71) Applicant: QUALCOMM Incorporated, San Diego, CA (US)

(72) Inventors: Liangchi Hsu, San Diego, CA (US); Sitaramanjaneyulu Kanamarlapudi, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 14/516,429

(22) Filed: Oct. 16, 2014

Related U.S. Application Data

(60) Provisional application No. 62/002,092, filed on May 22, 2014.

(51) Int. Cl.
*H04W 72/10* (2009.01)
*H04W 88/06* (2009.01)

(52) U.S. Cl.
CPC .............. *H04W 72/10* (2013.01); *H04W 88/06* (2013.01)

(58) Field of Classification Search
CPC ....... H04W 72/10; H04W 88/06; H04W 8/18; H04L 43/0876; H04L 63/0853
See application file for complete search history.

(56) References Cited

U.S. PATENT DOCUMENTS

| 2012/0021755 | A1 | 1/2012 | Chin et al. | |
|---|---|---|---|---|
| 2013/0295920 | A1 | 11/2013 | Viswanadham et al. | |
| 2015/0023258 | A1* | 1/2015 | Hu et al. | 370/329 |
| 2015/0056998 | A1* | 2/2015 | Kaikkonen et al. | 455/436 |

FOREIGN PATENT DOCUMENTS

GB          2 485 433 A     5/2012

OTHER PUBLICATIONS

International Search Report and Written Opinion dated Jul. 30, 2015 issued in International Patent Application No. PCT/US2015/027774.

\* cited by examiner

*Primary Examiner* — Curtis Odom
(74) *Attorney, Agent, or Firm* — Arent Fox LLP

(57) ABSTRACT

Methods and apparatuses are presented controlling access to a radio resource of a multi-subscriber identity module (SIM) user equipment (UE). For example, an example method is presented that includes initiating a call on a first subscription of the UE, and generating, during the call, a message for transmission to a network entity associated with a second subscription of the UE. Additionally, the example method may include starting a timer upon receiving the message at a transmission buffer of the UE. Moreover, the example method may include determining, upon expiration of the timer, that the message is pending transmission at the transmission buffer to the network entity, and transmitting the response based at least in part on determining that the message is pending transmission upon expiration of the timer. Responses may also be transmitted during inactivity gaps in the call.

30 Claims, 11 Drawing Sheets

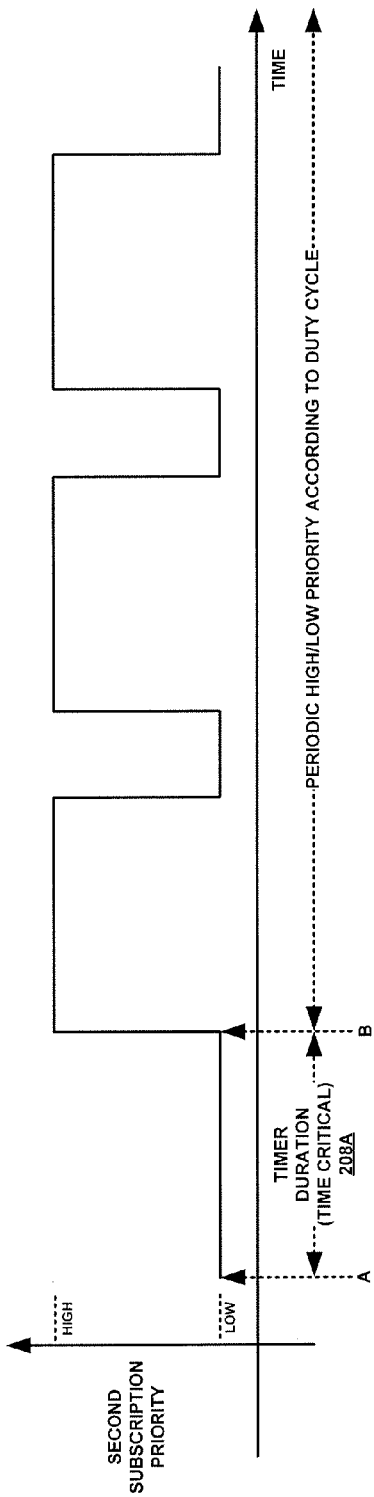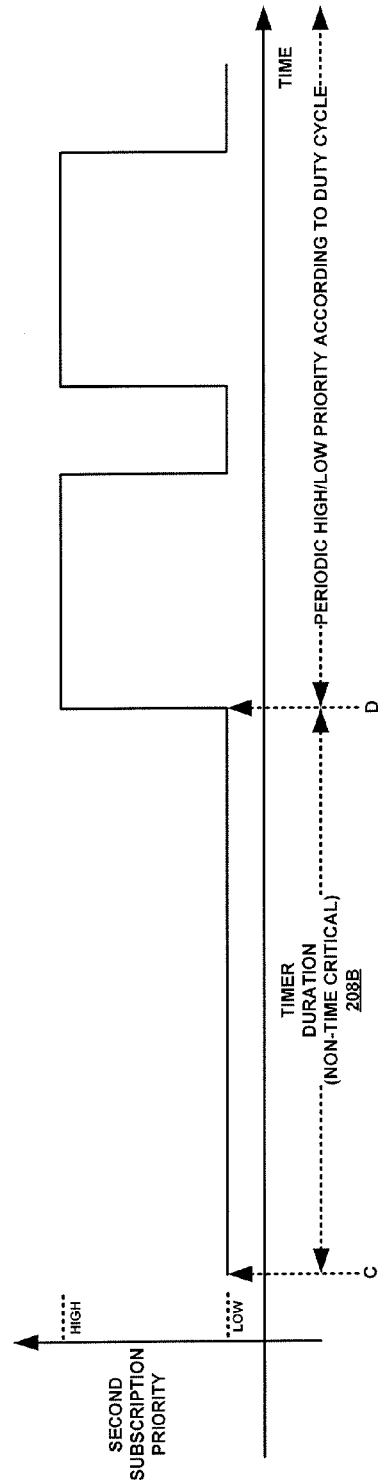

SIGNALING RADIO BEARER TIMER FOR DUAL-SIM DUAL-ACTIVE USER EQUIPMENT TRANSMITTER SHARING

CROSS REFERENCE TO RELATED APPLICATION

The present Application for Patent claims priority to Provisional Application No. 62/002,092, entitled "Signaling SRB Timer-Based Protection for DSDA TX Sharing," filed May 22, 2014, and assigned to the assignee hereof, and expressly incorporated by reference herein for all applicable purposes.

BACKGROUND

The present disclosure relates to the field of wireless communications, and more particularly to methods and apparatuses for transmitter sharing in multi-subscriber identity module user equipment (UE).

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (WCDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

Additionally, some UEs are configured to facilitate communication via multiple unique subscriptions, each being associated with a subscriber identity module (SIM) of multiple SIMs present on the device. In other words, multi-SIM devices (e.g., dual-SIM, dual active (DSDA) or dual-SIM, dual standby (DSDS) devices) may include one SIM associated with a first subscription and a second SIM associated with a second subscription. Furthermore, each subscription may be associated with one or more radio access technology (RAT) types.

In multi-SIM UEs, a single radio resource and its associated transceiver chain may be shared between the individual subscriptions. Furthermore, if one subscription enters a traffic or an access state (e.g., initiates and/or conducts a call) it may be given priority access to the radio resource for as long as the call lasts. As a result, other subscriptions of the UE will be unable to initiate a call, transmit measurement reports, receive signaling messages, or transmit responses to these signaling messages during the call so long as the shared radio resource gives priority to the subscription conducting the call.

Thus, as multi-SIM and/or multi-RAT UEs share limited communications resources, there is a need for methods and apparatuses to allow for non-call subscriptions of the UE to utilize the shared radio resource during a call on another subscription.

SUMMARY

The following presents a simplified summary of one or more aspects of the disclosure in-order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure describes example methods and apparatuses for controlling access to a radio resource of a multi-SIM UE. In an aspect, the present disclosure presents a method for controlling access to a radio resource of a multi-SIM UE, which may include initiating a call on a first subscription of the UE. Additionally, the example method may include generating, during the call, a message for transmission to a network entity associated with a second subscription of the UE. In addition, the method may include starting a timer upon receiving the message at a transmission buffer of the UE. Moreover, the example method may include determining, upon expiration of the timer, that the message is at the transmission buffer pending transmission to the network entity. Furthermore, the example method may include transmitting the message based on determining that the response is pending transmission upon expiration of the timer.

In an additional aspect, the present disclosure describes an example multi-SIM UE, which may include means for initiating a call on a first subscription of the UE. Additionally, the example multi-SIM UE may include means for generating, during the call, a message for transmission to a network entity associated with a second subscription of the UE. In addition, the example multi-SIM UE may include means for starting a timer upon receiving the response at a transmission buffer of the UE. Moreover, the example multi-SIM UE may include means for determining, upon expiration of the timer, that the message is at the transmission buffer pending transmission to the network entity. Furthermore, the example multi-SIM UE may include means for transmitting the message based at least in part on determining that the message is pending transmission upon expiration of the timer.

In an additional aspect, the present disclosure presents a non-transitory computer-readable storage medium storing computer executable code. In an aspect, the computer executable code may include code to initiate a call on a first subscription of a multi-SIM UE. In addition, the computer executable code may include code to generate, during the call, a message for transmission to a network entity associated with a second subscription of the UE. Moreover, the computer executable code may include code to start a timer upon receiving the message at a transmission buffer of the UE. Furthermore, the computer executable code may include code to determine, upon expiration of the timer, that the message is at the transmission buffer pending transmission to the network entity. Additionally, the computer executable code may include code to transmit the message based at least in part on determining that the response is pending transmission upon expiration of the timer.

In an additional aspect, the present disclosure presents an example multi-SIM UE, which may include a call initiating component configured to initiate a call on a first subscription of the UE. In addition, the multi-SIM UE may include a message generating component configured to generate, during the call, a message for transmission to a network entity associated with a second subscription of the UE. In addition, the multi-SIM UE may include a timer starting component configured to start a timer upon receiving the message at a transmission buffer of the UE. Moreover, the multi-SIM UE may include a pending message determining component configured to determine, upon expiration of the timer, that the message is at the transmission buffer pending transmission to the network entity. Additionally, the multi-SIM UE may include a message transmitting component configured to transmit the message based at least in part on determining that the message is pending transmission upon expiration of the timer.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

FIG. 2B is a diagram illustrating an example of radio resource priority over time for a second subscription where a procedure type associated with a message is timing critical;

FIG. 2C is a diagram illustrating an example of radio resource priority over time for a second subscription where a procedure type associated with a message is non-timing critical;

DETAILED DESCRIPTION

Figure 1:
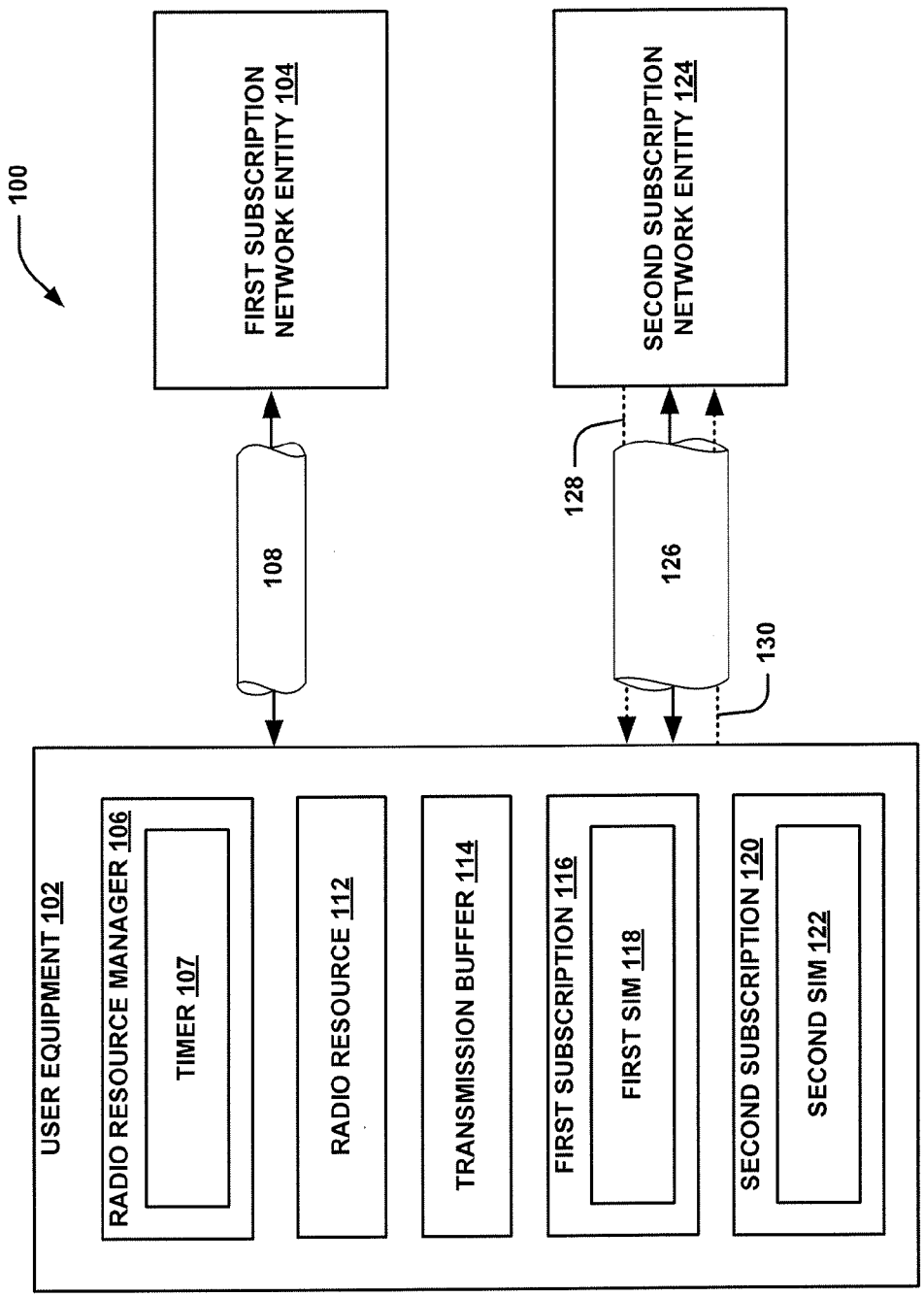
FIG. 1 is a block diagram illustrating an example wireless communications system according to the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. The term "component" as used within this disclosure may be one of the parts that make up a system, may be hardware or software, a combination of hardware and software, a processor or portion thereof that is configured to perform functions associated with an individual component introduced herein, and may be divided into other components (e.g., sub-components).

The present disclosure presents methods and apparatuses for improved procedures for generating and transmitting messages to network entities corresponding to one or more subscriptions of a multi-SIM UE. For example, in an operational scenario contemplated by the present disclosure, a multi-SIM UE may include a first subscription and a second subscription, with the first subscription having a higher priority for access to a shared radio resource (e.g., transmitter, receiver, and/or transceiver) of the UE relative to the second subscription. In other words, when the first subscription having higher priority initiates a call using the radio resource, the first subscription may traditionally have priority for access or use of the radio resource over the second subscription. For example, where the first subscription is a Global System for Mobile Communications (GSM) subscription and the second subscription is a Wideband Code Division Multiple Access (WCDMA) subscription, the GSM subscription may traditionally have priority for access to or use of the radio resource vis-à-vis the WCDMA subscription.

In an aspect of the present disclosure, the second subscription of the UE may be configured to generate one or more message for transmission to a network entity for reasons discussed in further detail below. For example, the UE may determine that a call is to be initiated on the second subscription during a call on the first subscription, and that a call establishment message is to be generated and transmitted to the network entity. In another example, the UE may generate one or more measurement reports (e.g., reporting a signal strength of one or more network entities) that are to be transmitted to the network entity. In a further aspect, the second subscription may receive one or more signaling messages (e.g., signaling radio bearer (SRB) messages) during a period when the first subscription is conducting a call. These signaling messages may instruct the second subscription to perform one or more configuration processes or procedures associated with the second subscription. For example, these configuration processes or procedures may include, but are not limited to, Radio Resource Control (RRC) management procedures, radio bearer control or release procedures, transport channel configuration procedures, cell update procedures, or the like. In response, the UE performs the configuration process associated with the signaling message and generates and transmits a message (e.g., a response message) to the network entity of the second subscription indicating that the signaling message was received and that the corresponding configuration process has been completed.

Where, however, the call on the first subscription is ongoing and has a higher relative priority when the signaling message(s) are received, the second subscription may not have adequate access to the shared radio resource to transmit the one or more messages to the network entity of the second subscription. As such, in an aspect of the present disclosure, a component of the UE (e.g., radio resource manager 106, described in detail below) may force a higher priority for access to the radio resource to the second subscription under certain conditions. For instance, in an aspect, the UE may maintain a timer that begins or starts when a configuration process (e.g., performed by the UE in response to the signaling message) is complete and the UE has generated and queued (e.g., in a transmission buffer of the UE) a response to signaling message(s) for transmission to the network entity. In other examples, the timer may start when a call establishment message or measurement report message has been generated and is queued in the transmission buffer. Upon expiration of this timer, the UE may provide higher priority to the second subscription relative to the other subscription(s) (e.g., the first subscription) for access to the shared radio resource such that any messages associated with the second subscription that are pending transmission (e.g., in the transmission buffer) are transmitted to the network entity.

Furthermore, calls typically contain periods of temporary inactivity during which no data is being transmitted or received by the UE. By some estimates, these periods of inactivity, or "inactivity gaps," comprise an average of thirty percent of call time during a call. Thus, in an additional aspect of the present disclosure, when a transmission and/or reception gap, or "inactivity gap" in a call on the first subscription is detected, the UE may provide higher priority to the second subscription relative to the other subscriptions for access to the shared radio resource until the inactivity gap has ended (e.g., call data is received or is to be transmitted). As such, any messages associated with the second subscription that are pending transmission (e.g., in a transmission buffer of the UE) are transmitted to the network entity in response to detecting the inactivity gap of the call.

Thus, according to aspects of the present disclosure, one or more messages to signaling message(s) may be transmitted to a network entity during one or more inactivity periods in a call associated with a first subscription of the UE. In addition, where one or more messages remain pending (i.e., the inactivity periods are insufficient for transmission of all messages), the UE may transmit the remaining messages after expiration of a timer. Therefore, by implementing the above-outlined aspects of the present disclosure, a UE may utilize timers and inactivity period detection methods to control, regulate, manage, or schedule access to a shared radio resource for a subscription that does not have default priority to the radio resource during an ongoing call. As such, delay in transmitting messages associated with the second subscription is mitigated and UE and network resources can be maximized.

FIG. 1 is a schematic diagram illustrating a system 100 for wireless communication, according to an example configuration. In an aspect, system 100 may include a UE 102 and one or more network entities associated with one or more subscriptions of UE 102. For example, system 100 may include an example first subscription network entity 104, which may communicate wirelessly with a first subscription 116 of one or more UEs 102 over one or more wireless communication channels 108. In an aspect, the one or more wireless communication channels 108 may include, in a non-limiting aspect, signaling channels, data communication channels, paging channels, and/or control channels.

Additionally, system 100 may include an example second subscription network entity 124, which may communicate wirelessly with a second subscription 120 of one or more UEs 102 over one or more wireless communication channels 126. In an aspect, the one or more wireless communication channels 126 may include, in a non-limiting aspect, signaling channels, data communication channels, paging channels, and/or control channels. Furthermore, UE 102 may receive one or more signaling messages from one or more network entities. For example, second subscription 120 may receive one or more signaling messages 128 (e.g., SRB messages) from second subscription network entity 124 over one or more wireless communication channels 126. In addition, second subscription 130 may be configured to generate and transmit one or more messages 130 to second subscription network entity 124. In some examples, these messages 130 may be in response to receiving the one or more signaling messages 128. In other examples, the messages 130 may include one or more measurement reports or one or more call initiation or call setup messages.

UE 102 may comprise any type of mobile device, such as, but not limited to, a smartphone, cellular telephone, mobile phone, laptop computer, tablet computer, a device associated with the Internet of Things (IoT), or other portable networked device. In addition, UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In general, UE 102 may be small and light enough to be considered portable and may be configured to communicate wirelessly via an over-the-air communication link using one or more OTA communication protocols described herein.

Additionally, in some examples, UE 102 may be configured to facilitate communication on a plurality of separate networks via a plurality of separate subscriptions, such as, but not limited to, first subscription 116 and second subscription 120. As such, UE 102 may comprise a multi-SIM UE (e.g., dual-SIM, dual active (DSDA), dual SIM, dual standby (DSDS) UE, triple SIM, triple standby (TSTS), QuadSIM UE, OctaSIM, or a UE having any number of unique SIM cards and/or subscriptions), which may include multiple SIM cards. In an aspect where UE 102 comprises a DSDA UE, the UE 102 may include a first SIM card 118 (or first SIM 118) for the first subscription 116 and a second SIM card 122 (or second SIM 122) for the second subscription 120. Furthermore, although only two SIMs and two subscriptions are illustrated in FIG. 1, the UE 102 may contain any number of subscriptions and related SIMs. For example, in some examples, each subscription may facilitate communication via a plurality of radio access technologies (RATs) or may facilitate communication via a single RAT. In an aspect, the specific RAT or RATs supported by a particular subscription may comprise any RAT or RATs known in the art and/or disclosed herein.

Furthermore, UE 102 may include a radio resource manager 106, which may be configured to control access to a radio resource 112 of UE 102 between multiple subscriptions. For example, radio resource manager 106 may be configured to set, maintain, or otherwise assign relative priorities for access to radio resource 112 for first subscription 116 and second subscription 120 (or more subscriptions of UE 102 when more subscriptions are supported) at any given time and for any time period. As such, the disparate subscriptions of UE 102 may receive and/or transmit signals to their corresponding networks. In an additional aspect, radio resource manager 106 may include a timer 107. The radio resource manager 106 (or a sub-component therein) may be configured to start timer 107 when the message 130 associated with the second subscription for transmission to second subscription network entity 124 is received at a transmission buffer 114 of the UE 102. Radio resource manager 106 is discussed in detail below in reference to FIG. 3. Furthermore, in an aspect, radio resource 112 may be shared by first subscription 116 and second subscription 120, and may comprise a transceiver, receiver, transmitter, and/or related circuitry for performing wireless communications between UE 102 and first subscription network entity 104 and/or second subscription network entity 124. In some instances, a transceiver or portions of a transceiver in radio resource 112 may be referred to as a transceiver chain. Similarly for a transmitter and/or a receiver in radio resource 112.

In addition, UE 102 may include a transmission buffer 114, which may comprise a memory that is configured to store one or more messages that are queued for transmission to a network entity (e.g., second subscription network entity 124). Furthermore, in an aspect, transmission buffer 114 may be any type of memory, including, but not limited to, a solid state, volatile, non-volatile, magnetic, or other memory, and/or a portion thereof. In addition, transmission buffer 114 may be associated with an uplink queue corresponding to radio resource 112, and, like radio resource 112, transmission buffer 114 may be shared by one or more subscriptions of UE 102. In addition, transmission buffer 114 may comprise a memory buffer between a plurality of logical layers of the UE 102, such as between an RRC layer and a lower layer (e.g., a physical layer) and may be utilized for storing messages for communication between the layers.

Furthermore, first subscription network entity 104 and second subscription network entity 124 of FIG. 1 may comprise one or more of any type of network module, such as an access point, a macro cell, including a base station (BS), node B, eNodeB (eNB), a relay, a peer-to-peer device, an authentication, authorization and accounting (AAA) server, a mobile switching center (MSC), a radio network controller (RNC), or a small cell. As used herein, the term "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a base station (BS), an access point, a femto node, a femtocell, a pico node, a micro node, a Node B, evolved Node B (eNB), home Node B (HNB) or home evolved Node B (HeNB). Therefore, the term "small cell," as used herein, refers to a relatively low transmit power and/or a relatively small coverage area cell as compared to a macro cell. Additionally, first subscription network entity 104 may communicate with one or more other network entities of wireless and/or core networks Additionally, system 100 may include any network type, such as, but not limited to, wide-area networks (WAN), wireless networks (e.g. 802.11 or cellular network), the Public Switched Telephone Network (PSTN) network, ad hoc networks, personal area networks (e.g. Bluetooth®) or other combinations or permutations of network protocols and network types. Such network(s) may include a single local area network (LAN) or wide-area network (WAN), or combinations of LANs or WANs, such as the Internet. Such networks may comprise a Wideband Code Division Multiple Access (WCDMA) system, and may communicate with one or more UEs 102 according to this standard. As those skilled in the art will readily appreciate, various aspects described throughout this disclosure may be extended to other telecommunication systems, network architectures and communication standards. By way of example, various aspects may be extended to other Universal Mobile Telecommunications System (UMTS) systems such as Time Division Synchronous Code Division Multiple Access (TD-SCDMA), High Speed Downlink Packet Access (HSDPA), High Speed Uplink Packet Access (HSUPA), High Speed Packet Access Plus (HSPA+) and Time-Division CDMA (TD-CDMA). Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), Institute of Electrical and Electronics Engineers (IEEE) 802.11 (Wi-Fi), IEEE 802.16 (WiMAX®), IEEE 802.20, Ultra-Wideband (UWB), Bluetooth, and/or other suitable systems. The actual telecommunication standard, network architecture, and/or communication standard employed will depend on the specific application and the overall design constraints imposed on the system. The various devices coupled to the network(s) (e.g., UEs 102, first subscription network entity 104, second subscription network entity 124) may be coupled to a core network via one or more wired or wireless connections.

Figure 2A:
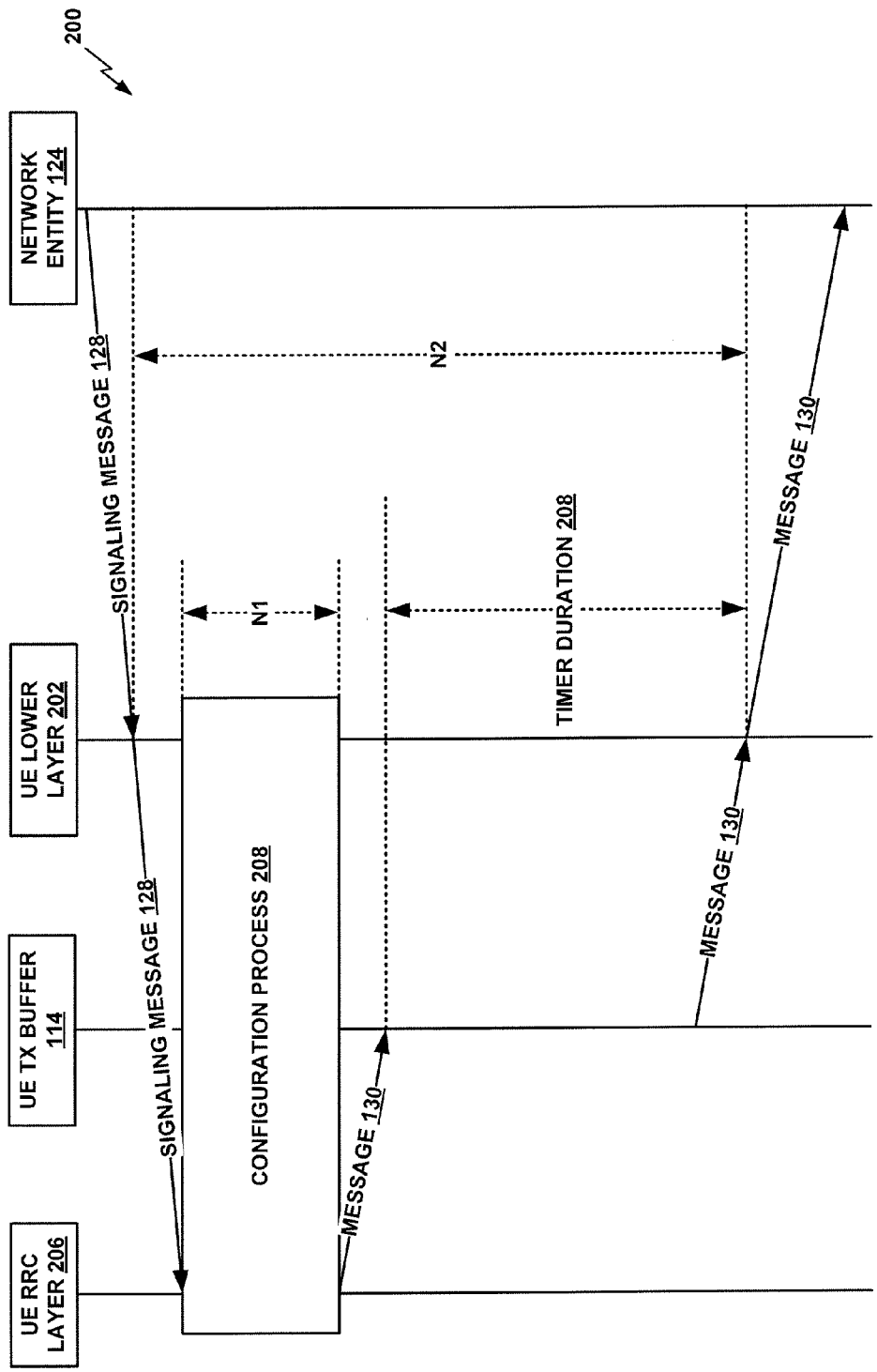
FIG. 2A is a signal flow diagram illustrating an example signal flow according to aspects of the present disclosure.

FIG. 2A is a signal flow diagram illustrating an example signal flow 200 according to example aspects of the present disclosure. Specifically, signal flow 200 illustrates the flow of a signaling message 128 (e.g., a signaling radio bearer (SRB) message) and a corresponding message 130 (e.g., a response message in response to the signaling message 128) between a network entity (e.g., second subscription network entity 124 of FIG. 1) and a UE (e.g., UE 102 of FIG. 1). However, although signal flow 200 illustrates message 130 as a response to signaling message 128, according to aspects of the present disclosure, message 130 is not limited to such a response message. Instead, in some examples, message 130 may include one or more measurement reports or a call establishment message generated by the UE 102 independent of a signaling message 128.

Turning to signal flow 200, initially, a network entity 124 may generate and transmit a signaling message 128 to a lower layer 202 of UE 102. The UE lower layer 202, which may, in some examples, comprise a physical layer, may pass the message upward in the communication protocol stack to a UE RRC layer 206. In an aspect, the UE RRC layer 206 may analyze the signaling message 128 to determine whether the signaling message includes a command for the UE 102 to perform a configuration process 208. The UE lower layer 202 and UE RRC layer 206 may each be implemented as one or more layer entities (e.g., a specialized architectural and/or operational functional block) that are configured to perform the functions associated with the respective layer.

The configuration process 208 may include any configuration process commanded by a network entity using a signaling message 128. For example, in a non-limiting aspect, the configuration process may include transfer of a state of subscription (e.g., transfer to a CELL_DCH, CELL_FACH, CELL_PCH, URA_PCH, IDLE MODE or any other cell state). Furthermore, the configuration process may be associated with a specific type of signaling message 128 received from (second subscription) network entity 124. These types of signaling messages 128 may include, but are not limited to: RRC connection setup, RRC connection release, paging messages (e.g., paging type 1), UE capability inquiry, security mode command, signaling connection release, counter check, earthquake and tsunami primary (ETWS) notification, radio bearer setup, radio bearer reconfiguration, radio bearer release, transport channel reconfiguration, transport format reconfiguration, transport format combination control, physical channel reconfiguration, physical shared channel allocation, uplink physical channel control, or any other signaling message 128 or related configuration process command. In response to receiving the signaling message 128, the UE may commence and execute the configuration process 208 specified by the signaling message 128.

According to specifications promulgated by the Third Generation Partnership Project (3GPP), maximum time periods exist for (a) completing the configuration process 208 associated with the signaling message 128 and (b) transmitting the message 130 to the network entity 124. For example, 3GPP RRC standard specification TS 25.331 (hereby incorporated by reference) specifies a time N1 for completing the configuration process 208. In other words, N1 represents an upper limit on a time period required to execute any modifications at the UE 102 once the signaling message 128 is received at UE RRC layer 206. In some examples, N1 may be specified as a number of transfer time intervals (TTIs) and/or may represent a number of 10 ms time periods.

In addition, 3GPP RRC standard specification TS 25.331 specifies a time N2 for transmitting the message 130 to the network entity 124. As such, N2 represents a number of radio frames (e.g., 10 ms radio frames) starting upon reception of the signaling message 128 at UE lower layer 202 before the message 130 must be transmitted to network entity 124.

Furthermore, FIG. 2A illustrates a timer duration 208 associated with a timer 107 maintained by radio resource manager 106 according to an aspect of the present disclosure. As shown in FIG. 2A, this timer duration 208 may begin when the message 130 arrives at a transmission buffer 114 (also referred to as a UE transmission buffer) after being generated and sent to the UE transmission buffer 114 via the UR RRC layer 206. The timer duration 208 may define a time duration, after which the radio resource manager 102 of the UE 102 may give higher priority for access to a radio resource 112 to the second subscription (i.e., a non-call subscription) relative to a first subscription conducting a call. Based on providing the higher relative priority to the second subscription of UE 102, the message 130 may be passed UE lower layer 202 for transmission to network entity 124. In other words, upon expiry of the timer after timer duration 208, the radio resource 112 of UE 102 may be handed over to the second subscription such that message 130 (and/or any other messages, e.g., call initiation or establishment messages, measurement reports, that are pending transmission) may be transmitted to network entity 124.

In an aspect, the timer duration 208 may be based on whether a procedure type corresponding to the message 130 is timing critical or non-timing critical. In an aspect, a message 130 associated with a procedure that is timing critical may have a shorter timer duration 208 than a message associated with a procedure that is non-timing critical. This aspect of the present disclosure is illustrated in FIGS. 2B and 2C, which each present a diagram illustrating an example of radio resource priority over time for a second subscription. In FIG. 2B, the procedure type associated with a message 130 is timing critical whereas the procedure type associated with the message 130 is non-timing critical. As a result, the timer duration 208 of FIG. 2B is shorter than that of FIG. 2C.

In each of FIGS. 2B and 2C, the vertical axis represents a priority of the second subscription (e.g., a WCDMA subscription) vis-à-vis a first subscription (e.g., a GSM subscription) of a multi-SIM UE. Referring first to FIG. 2B, at time A, the message 130 may be received at a transmission buffer 114. As the message 130 of FIG. 2B has an associated procedure type that is timing critical, timer 107 having a timer duration 208A may be started at time A. Likewise, referring to FIG. 2C, at time C, a message 130 may be received at transmission buffer 114. However, as the message 130 of FIG. 2C is non-timing critical, the timer duration 208B of FIG. 2C is longer than that of timer duration 208 A of FIG. 2B. For both diagrams of FIGS. 2B and 2C, the second subscription priority for access to the shared radio resource 112 is kept low during the respective timer durations 208A and 208B. However, in an aspect, when the timer durations 208A and 208B expire at time B and D, respectively, radio resource manager 106 may place the second subscription priority to a high level relative to the first subscription such that the second subscription has access to the shared radio resource 112. The radio resource manager 106 may thereafter oscillate the relative priority of the second subscription from high to low (and vice versa) based on a particular duty cycle and/or frequency. As a result, messages 130 may be transmitted during the periods corresponding to the high priority for the second subscription.

Furthermore, in an aspect, some messages may change from time to time from timing critical to non-timing critical. For example, in some examples where the message comprises a measurement report, the message may be changed from non-timing critical to timing critical when radio conditions pass below a threshold value. By altering the measurement report message from non-timing critical to timing critical, the UE may expedite transmission of the measurement report to enable the network entity to take appropriate action to resolve any problems with the radio conditions. Additionally, whether a particular message is timing critical or non-timing critical may be based on the type of message. For example, random access channel (RACH) messages (e.g., RRC connection request messages, call establishment or call initiation messages, cell update messages, routing area update messages) may be considered timing critical.

In addition, although not specifically illustrated in FIG. 2A, but will be apparent based on at least the description below, the radio resource manager 106 may opportunistically give higher priority to second subscription 120 during one or more inactivity periods of a call on the first subscription 116 such that one or more messages 130 may be transmitted to network entity 124 during the one or more inactivity periods. Where such inactivity period message transmissions are not sufficient to transmit all messages queued for transmission before expiry of the timer, the radio resource manager 106 may give higher priority to the second subscription as described above such that the remaining messages may be transmitted.

Figure 3:
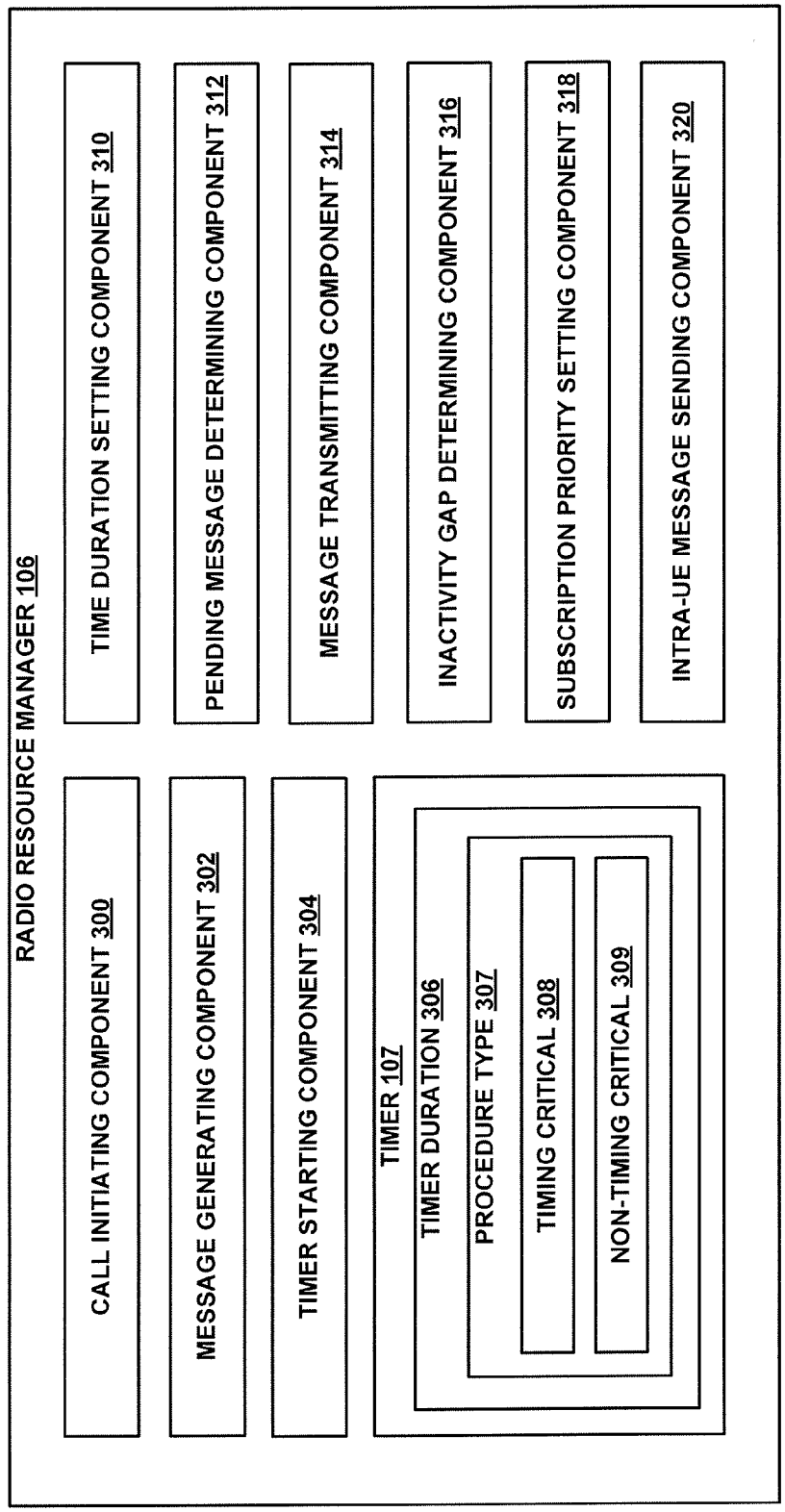
FIG. 3 is a block diagram illustrating an example radio resource manager according to an example apparatus of the present disclosure.

Turning to FIG. 3, an example radio resource manager 106 (of FIG. 1, for example) is presented as comprising a plurality of individual components for carrying out the one or more methods or processes described herein. For example, in an aspect, radio resource manager 106 may include a call initiating component 300, which may be configured to initiate a call on a first subscription of a UE (e.g., UE 102 of FIG. 1). In an aspect, the call may be initiated on a first subscription that has a default or initial priority for a radio resource 112 that is higher relative to a second subscription of the UE 102. Furthermore, call initiating component 300 may be configured to determine to initiate a call on the second subscription. Such a determination may be made by call initiating component 300, for example, based on a command to initiate the call generated at the UE or based on the UE receiving a paging message from a network entity indicating that indicates that a disparate UE seeks to initiate a call with the second subscription of the UE.

In addition, radio resource manager 106 may include a message generating component 302 that may be configured to generate one or more messages (e.g., messages 130 of FIGS. 1 and 2). In some examples, these messages 130 may be generated in response to one or more signaling messages 128 received by the UE 102. In some examples, such signaling messages 128 may be associated with a second subscription 120 of the UE 102 and may be generated and transmitted to a network entity (e.g., second subscription network entity 124 of FIG. 1) where a configuration process 208 associated with a signaling message is completed. In an aspect, the specific type of message 130 may depend upon the type of signaling message 128 received. Furthermore, the type of message 130 may include, but is not limited to: UTRAN mobility information confirm, physical channel reconfiguration complete, transport channel reconfiguration complete, radio bearer reconfiguration complete, radio bearer release complete, UTRAN mobility information confirm/failure, active set update complete/failure, handover to UTRAN complete, handover from UTRAN failure, measurement control failure, UE information message, or any other message (e.g., message message) type.

In some examples, the message 130 generated by message generating component 302 may be a call establishment message, which may be generated based on call initiating component 200 determining to initiate a call (e.g., a call associated with the second subscription). In some examples, the call to be initiated may comprise a packet-switched (PS) call. In such examples, the message may comprise a PS call establishment message. However, in some examples, the message may comprise a circuit-switched (CS) call establishment message.

In addition, in some examples, message generating component 302 may be associated with an RRC layer of the UE 102. As such, in some examples, message generating component 302 may be configured to generate one or more messages 130 in response to one or more signaling messages 128 received at the RRC layer.

In an additional aspect, radio resource manager 106 may include a timer starting component 304. The timer starting component 304 may be configured to start a timer 107 when the message generated by message generating component 302 is received at a transmission buffer 114 of the UE 102. In addition, timer 107 may have an associated time duration 308, which may be set by time duration setting component 310. Thus, time duration 308 may reflect the amount of time that timer 107 runs before expiring.

In an aspect, time duration setting component 310 may set the time duration 308 based on whether a procedure type 307 corresponding to the message 130 is timing critical 308 or non-timing critical 309. In some examples, the procedure type 307 may correspond to a type of signaling message 128 received by the UE 102, whether the procedure type is a call establishment procedure, a measurement report message generating procedure, and/or a specific state transition associated with the signaling message 128. For instance, in some examples, time duration setting component may be configured to set a time duration 308 according to whether the procedure type 307 (column 1) is time-critical, which is indicated in the fourth column of Table 1, below. In Table 1, each row may indicate a procedure type (which may correspond to a type of signaling message 128 received by UE 102) and an associated message 130 that is to be transmitted to network entity 124 (e.g., upon completion of a configuration process 208 (see FIG. 2A), or upon the generation of a call establishment or measurement report message). In addition, Table 1 indicates non-limiting associated values for N1 and N2 (see FIG. 2A) that may be associated with each signaling message or message type indicated in a particular row. In addition, as the time period required for completion of configuration process 208 may vary depending on UE-specific factors (e.g., processing capability), UE 102 may complete configuration process 208 before the completion of N1 (see FIG. 2A), as N1 comprises an upper-limit for acceptable performance. As such, in some examples, timer starting component 304 may be configured to start the timer 107 upon completion of configuration process 208 and therefore before N1 has completed. In these instances, time duration 308 may be extended by an amount of time, which may be equal to the time duration "left over" in N1 when the configuration process 208 is completed.

In addition, some signaling messages 128 (e.g., SRB messages) or associated messages 130 are not included in Table 1, below, but are nevertheless contemplated as potential signaling messages 128 of the present disclosure. For example, the signaling message or message types that are not included in Table 1 may comprise signaling message or message types that are non-timing-critical, but may be functionally critical for proper functionality of UE 102. Thus, in a non-limiting example, for those signaling messages 128 or messages 130 not included in Table 1, the associated timer duration 308 may be about 2000 ms. In addition, the N1 and N2 values of Table 1 include integer values that represent multiples of 10 ms. Furthermore, for some N2 values, a value "T" may be added. In an aspect, this value "T" represents a repetition period of a System Information Block (SIB) message, for example, SIB7 or SIB14.

In addition, though Table 1 shows examples of procedure types, signaling message types, and timer duration examples, these examples are by no means exhaustive or limiting. Instead, the values present in Table 1 are merely examples and can be altered or expanded.

TABLE 1

Procedure Types, Message Types, and Timer Duration Examples

| PROCEDURE TYPE 307 | SIGNALING MESSAGE TYPE | MESSAGE TYPE | TIMING CRITICAL? | N1 | N2 |
|---|---|---|---|---|---|
| RRC Connection Management Procedures | | | | | |
| RRC connection establishment Target state CELL_DCH | RRC CONNECTION SETUP | RRC CONNECTION SETUP COMPLETE | Yes | 10 | N/A |

TABLE 1-continued

Procedure Types, Message Types, and Timer Duration Examples

| PROCEDURE TYPE 307 | SIGNALING MESSAGE TYPE | MESSAGE TYPE | TIMING CRITICAL? | N1 | N2 |
|---|---|---|---|---|---|
| RRC connection establishment Target state CELL_FACH | RRC CONNECTION SETUP | RRC CONNECTION SETUP COMPLETE | Yes | 10 | 11 |
| RRC connection release From CELL_DCH state | RRC CONNECTION RELEASE | RRC CONNECTION RELEASE COMPLETE | Yes | 5 | 8 |
| RRC connection release From CELL_FACH state | RRC CONNECTION RELEASE | RRC CONNECTION RELEASE COMPLETE | Yes | NA | 11 |
| Paging | PAGING TYPE 1 | CELL UPDATE | Yes | 10 | 11 + T |
| UE capability enquiry | UE CAPABILITY ENQUIRY | UE CAPABILITY INFORMATION | Yes | NA | 8 |
| Security mode control | SECURITY MODE COMMAND | SECURITY MODE COMPLETE | Yes | 5 | 8 |
| Signalling connection release procedure | SIGNALLING CONNECTION RELEASE | | N/A | 5 | NA |
| Counter check | COUNTER CHECK | COUNTER CHECK MESSAGE | Yes | NA | 8 |
| ETWS Primary Notification with Security | ETWS PRIMARY NOTIFICATION WITH SECURITY | | N/A | 10 | NA |
| Radio Bearer control procedures | | | | | |
| Radio bearer establishment Target state CELL_DCH | RADIO BEARER SETUP | RADIO BEARER SETUP COMPLETE / FAILURE | No | 10 | NA |
| Radio bearer establishment From state CELL_FACH to state CELL_FACH | RADIO BEARER SETUP | RADIO BEARER SETUP COMPLETE / FAILURE | Yes | 10 | 11 |
| Radio bearer establishment From CELL_DCH to CELL_FACH | RADIO BEARER SETUP | RADIO BEARER SETUP COMPLETE | Yes | NA | NA |
| Radio bearer reconfiguration Target state CELL_DCH | RADIO BEARER RECONFIGURATION | RADIO BEARER RECONFIG. COMPLETE / FAILURE | No | 5 or 10 | NA |
| Radio bearer reconfiguration From Idle Mode and state CELL_FACH to state CELL_DCH | RADIO BEARER RECONFIGURATION | RADIO BEARER RECONFIG. COMPLETE / FAILURE | Yes | 10 | 11 |
| Radio bearer reconfiguration From state CELL_FACH to state CELL_FACH | RADIO BEARER RECONFIGURATION | RADIO BEARER RECONFIG. COMPLETE / FAILURE | Yes | 10 | 11 |
| Radio bearer reconfiguration From state CELL_DCH to state CELL_FACH | RADIO BEARER RECONFIGURATION | RADIO BEARER RECONFIG. COMPLETE | No | NA | NA |
| Radio bearer release Target state CELL_DCH | RADIO BEARER RELEASE | RADIO BEARER RELEASE COMPLETE / FAILURE | Yes | 10 | 11 |
| Radio bearer release From state CELL_FACH to state | RADIO BEARER RELEASE | RADIO BEARER RELEASE | Yes | 10 | 11 |

TABLE 1-continued

Procedure Types, Message Types, and Timer Duration Examples

| PROCEDURE TYPE 307 | SIGNALING MESSAGE TYPE | MESSAGE TYPE | TIMING CRITICAL? | N1 | N2 |
|---|---|---|---|---|---|
| CELL_FACH | | COMPLETE / FAILURE | | | |
| Radio bearer release From state CELL_DCH to state CELL_FACH | RADIO BEARER RELEASE | RADIO BEARER RELEASE COMPLETE | No | NA | NA |
| Transport channel reconfiguration Target state CELL_DCH | TRANSPORT CHANNEL RECONFIGURA- TION | TRANSPORT CHANNEL RECONFIGUR- ATION COMPLETE / FAILURE | No | 5 or 10 | NA |
| Transport channel reconfiguration From state CELL_FACH to state CELL_FACH | TRANSPORT CHANNEL RECONFIGURA- TION | TRANSPORT CHANNEL RECONFIGUR- ATION COMPLETE / FAILURE | Yes | 10 | 11 |
| Transport channel reconfiguration From state CELL_DCH to state CELL_FACH | TRANSPORT CHANNEL RECONFIGURA- TION | TRANSPORT CHANNEL RECONFIGUR- ATION COMPLETE | No | NA | NA |
| Transport format combination control AM or UM RLC mode | TRANSPORT FORMAT COMBINATION CONTROL | TRANSPORT FORMAT COMBINATION CONTROL FAILURE | Yes | 5 | 8 |
| Transport format combination control Transparent mode | TRANSPORT FORMAT COMBINATION CONTROL | | N/A | 5 | NA |
| Physical channel reconfiguration Target state CELL_DCH | PHYSICAL CHANNEL RECONFIGURA- TION | PHYSICAL CHANNEL RECONFIGUR- ATION COMPLETE / FAILURE | No | 5 or 8 | NA |
| Physical channel reconfiguration From state CELL_FACH to state CELL_FACH | PHYSICAL CHANNEL RECONFIGURA- TION | PHYSICAL CHANNEL RECONFIGUR- ATION COMPLETE / FAILURE | Yes | 8 | 9 |
| Physical channel reconfiguration From state CELL_DCH to state CELL FACH | PHYSICAL CHANNEL RECONFIGURA- TION | PHYSICAL CHANNEL RECONFIGUR- ATION COMPLETE | No | NA | NA |
| Physical Shared Channel Allocation [TDD only] | PHYSICAL SHARED CHANNEL ALLOCATION | | N/A | 5 | NA |
| Uplink Physical Channel Control [TDD only] | UPLINK PHYSICAL CHANNEL CONTROL | | N/A | 8 | NA |
| RRC connection mobility procedures | | | | | |
| Cell update | NONE or CELL UPDATE CONFIRM | UTRAN MOBILITY INFORMATION CONFIRM | Yes | 5 | 8 |
| | | PHYSICAL CHANNEL RECONFIGUR- TAION COMPLETE Target state CELL_FACH | Yes | 8 | 9 |
| | | PHYSICAL CHANNEL RECONFIGUR- | Yes | 8 | NA |

TABLE 1-continued

Procedure Types, Message Types, and Timer Duration Examples

| PROCEDURE TYPE 307 | SIGNALING MESSAGE TYPE | MESSAGE TYPE | TIMING CRITICAL? | N1 | N2 |
|---|---|---|---|---|---|
| | | ATION COMPLETE Target state CELL_DCH | | | |
| | | TRANSPORT CHANNEL RECONFIGUR-ATION COMPLETE Target state CELL_FACH | Yes | 10 | 11 |
| | | TRANSPORT CHANNEL RECONFIGUR-ATION COMPLETE Target state CELL_DCH | Yes | 10 | NA |
| | | RADIO BEARER RECONFIGUR-ATION COMPLETE Target state CELL_FACH | Yes | 10 | 11 |
| | | RADIO BEARER RECONFIGUR-ATION COMPLETE Target state CELL_DCH | Yes | 10 | NA |
| | | RADIO BEARER RELEASE COMPLETE Target state CELL_DCH | Yes | 10 | 11 |
| URA update | URA UPDATE CONFIRM | UTRAN MOBILITY INFORMATION CONFIRM | Yes | 5 | 8 |
| UTRAN mobility information | UTRAN MOBILITY INFORMATION | UTRAN MOBILITY INFORMATION CONFIRM / FAILURE | Yes | 5 | 8 |
| Active set update | ACTIVE SET UPDATE | ACTIVE SET UPDATE COMPLETE / FAILURE | Yes | NA | 5 |
| Inter-RAT handover to UTRAN | HANDOVER TO UTRAN COMMAND (other system) | HANDOVER TO UTRAN COMPLETE | No | NA | NA |
| Inter-RAT handover from UTRAN | HANDOVER FROM UTRAN COMMAND | HANDOVER FROM UTRAN FAILURE | No | NA | NA |
| Measurement procedures | | | | | |
| Measurement control | NONE or MEASUREMENT CONTROL | MEASUREMENT CONTROL FAILURE | Yes | 5 | 8 |
| UE INFORMATION | | | | | |
| UE INFORMATION | UE INFORMATION REQUEST | UE INFORMATION MESSAGE | Yes | 5 | 8 |

Additionally or alternatively, time duration setting component 310 may be configured to set time duration 308 associated with timer 107 based on one or more timing requirements associated with the first subscription, which may be conducting a call. For example, in some examples, one or more specifications (e.g., promulgated by 3GPP) may mandate that the radio resource 112 be utilized by the first subscription (e.g., have highest priority) for a particular percentage of time during a call (e.g., in a DSDA device). Alternatively or additionally, one or more specifications may mandate that the radio resource 112 may only be handed over to a second subscription after a minimum period of time during which the first subscription has highest priority relative to any other subscriptions associated with the UE 102. Thus, in these situations, the time duration setting component 310 may be configured to set the time duration 308 of timer 107 to comply with the one or more specification mandates.

In an additional aspect, radio resource manager 106 may include a pending message determining component 312, which may be configured to determine, upon expiration of the timer 107, whether one or more messages are pending transmission to a network entity at the transmission buffer 114 (FIG. 1). Furthermore, radio resource manager 106 may include a message transmitting component 314, which may be configured to transmit one or more messages 130 to a network entity based on determining that the one or more messages 130 are pending transmission upon expiration of the timer 107.

In an additional aspect of the present disclosure, radio resource manager 106 may include an inactivity gap determining component 316, which may be configured to determining that one or more inactivity gaps exists during a call on a first subscription of the UE. In some non-limiting examples, the inactivity gap determining component 316 may be configured to analyze one or more buffers (e.g., transmission buffer 114) or processing circuitry associated with the first subscription or the radio resource of the UE 102 to determine (a) whether data associated with the call has been received and/or (b) whether call data is to be transmitted in the uplink. Where no such data (or an amount of received or uplink call data below a threshold) is determined to be present, inactivity gap determining component 316 may determine that an inactivity gap is present in the call. In response to such a determination, message transmitting component 314 may be configured to transmit one or more messages during an inactivity gap of a call on a first subscription of the UE.

Furthermore, radio resource manager 106 may include a subscription priority setting component 318, which may be configured to set a relative priority of access to radio resource 112 for one or more subscriptions of UE 102. For example, in an aspect, subscription priority setting component 318 may be configured to set a highest priority to the second subscription for access to the radio resource based on inactivity gap determining component 316 determining that the inactivity gap exists during the call. In an additional aspect, subscription priority setting component 318 may be configured to set a highest priority to the second subscription for access to the radio resource 112 upon expiration of the timer 107. In other words, subscription priority setting component 318 may be configured to "hand off" the radio resource between subscriptions of the UE 102 based on the detection of an inactivity gap in a call on the first subscription and/or the expiration of timer 107. For purposes of the present disclosure, therefore, "handing off" the radio resource 112 from a first subscription to a second subscription may include subscription priority setting component 318 setting a higher priority for access to the radio resource 112 for the second subscription relative to the first subscription for a period of time. Thus, when the second subscription retains priority to the radio resource 112, it may transmit one or more messages 130, for example, during an inactivity gap or upon the expiration of timer 107.

In addition, radio resource manager 106 may include an intra-UE message sending component, which may be configured to send one or more messages 130 between, for example, logical layers (or logical layer entities). For example, in an aspect, message generating component 302 may be associated with an RRC layer (or RRC layer entity) of a UE protocol stack (see, e.g., FIG. 10). In an aspect, once each of the one or more messages 130 are generated by message generating component 302, intra-UE message sending component may send by the RRC layer (or RRC layer entity), the one or more messages 130 to the transmission buffer 114 for eventual transmission to an associated network entity. This example is not exclusive, however. Instead, message generating component 302 may be associated with any logical layer (or logical layer entity) of the protocol stack, which may include, but are not limited to, one or more logical layers illustrated in FIG. 10, below.

Additionally, though exemplary components 300, 302, 304, 306, 307, 308, 309, 310, 312, 314, 316, 318, and 320 are presented in reference to radio resource manager 106, they are not exclusive. Instead, radio resource manager 106 may include additional or alternative components configured to perform aspects of the present disclosure and the claims recited below.

Figure 4:
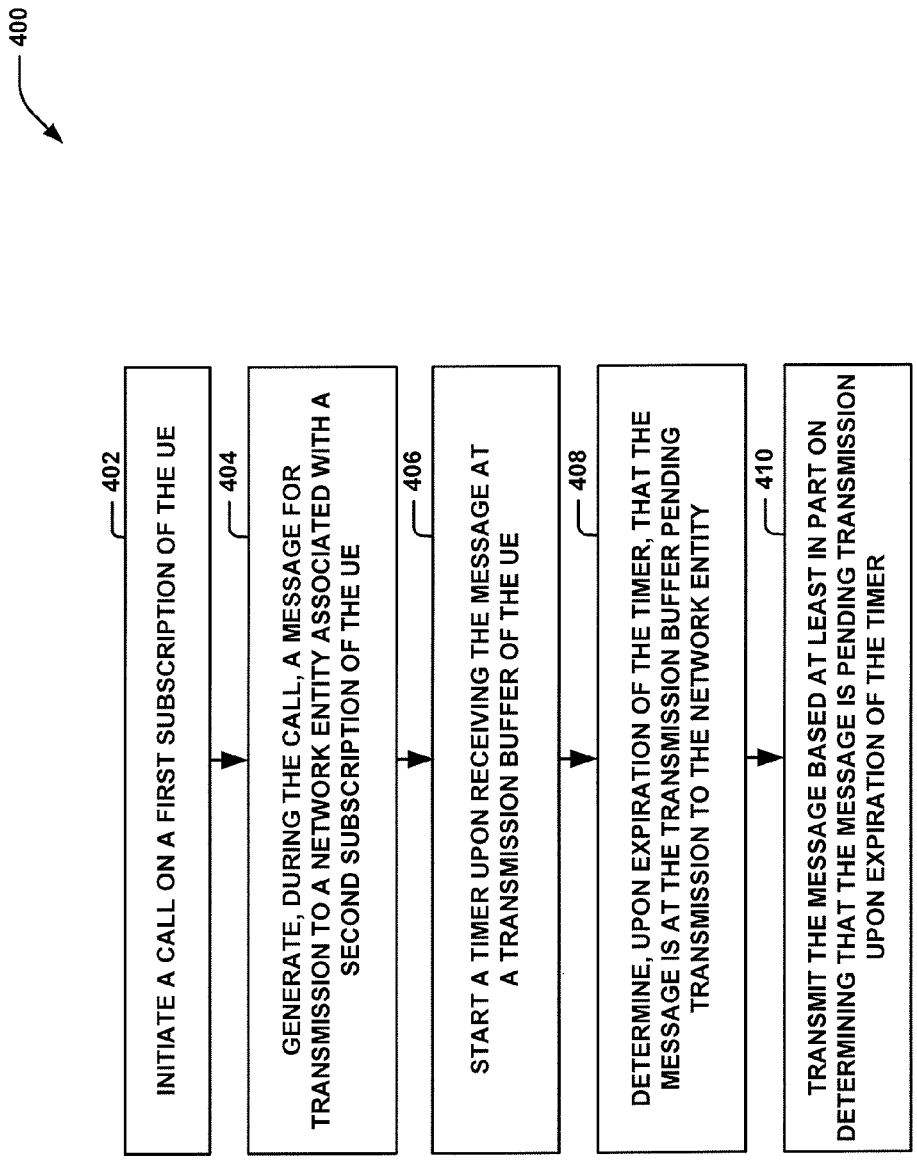
FIG. 4 is a flow diagram comprising a plurality of functional blocks representing an example methodology of the present disclosure.
Figure 5:
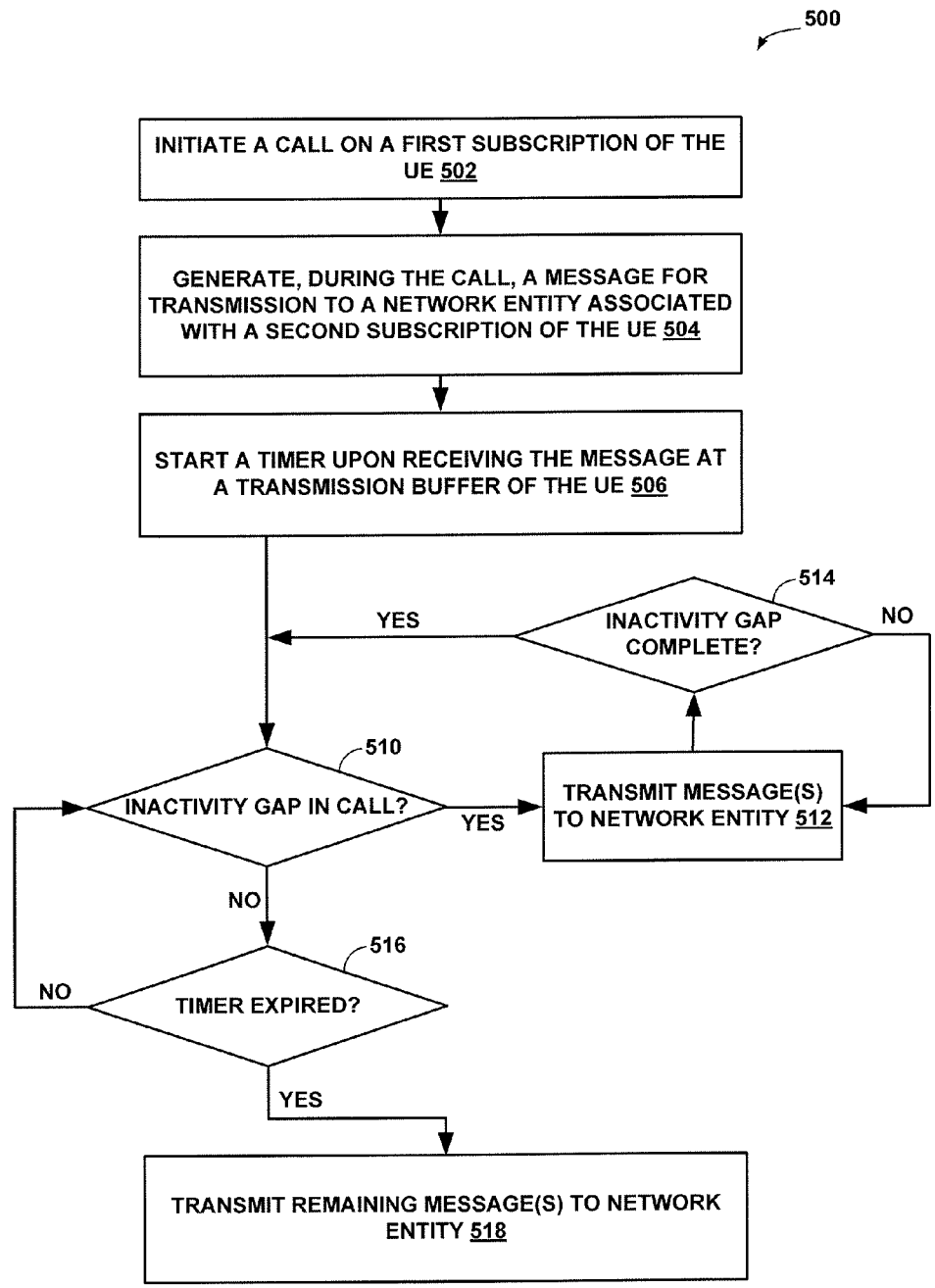
FIG. 5 is a flow diagram comprising a plurality of functional blocks representing an example methodology of the present disclosure.

FIGS. 4 and 5 present exemplary methodologies 400 and 500, each comprising a non-limiting set of steps represented as blocks that may be performed by an apparatus described herein (e.g. user equipment 102 of FIG. 1, radio resource manager 106 of FIGS. 1 and 3). In an aspect, methodology 400 and 500 may be related, and may include one or more shared or overlapping functions or steps. In addition, although the description of methodologies 400 and 500 may be presented in reference to a single signaling message and a single related message, these methodologies are not limited to this scenario. Instead, methodologies 400 and 500 may be performed with respect to a plurality of signaling messages and a plurality of corresponding messages.

Turning to FIG. 4, in an aspect, methodology 400 may comprise a method of controlling access to a radio resource of a multi-SIM UE. At block 402, for example, methodology 400 may include initiating a call on a first subscription of the UE. In an aspect, block 402 may be performed by call initiating component 300 of FIG. 3.

Furthermore, methodology 400 may include, at block 404, generating, during the call, a message for transmission to a network entity associated with a second subscription of the UE. Furthermore, in an aspect, block 404 may be performed by message generating component 302 of FIG. 3. In a further aspect, methodology 400 may include, at block 406, starting a timer upon receiving the message at a transmission buffer 114 of the UE. In an aspect, a plurality of timers may be started, each of which may be started based on receiving each of a plurality of messages at a transmission buffer 114 of the UE corresponding to each of a plurality of signaling messages received at block 406. Additionally, in some examples, block 406 may be performed by timer starting component 304 of FIG. 3.

In addition, methodology 400 may include, at block 408, determining, upon expiration of the timer, that the message is pending transmission at the transmission buffer 114 to the network entity. Furthermore, in some alternative examples, block 408 may include determining, upon expiration of the timer, that a plurality of messages are pending transmission to the network entity at the transmission buffer 114. In addition, in some examples, block 408 may be performed by pending message determining component 312 of FIG. 3.

Additionally, methodology 400 may include, at block 410, transmitting the message based at least in part on determining that the message is pending transmission upon expiration of the timer. In an aspect, block 410 may alternatively or additionally include transmitting a plurality of pending messages based on determining that the plurality of messages are pending transmission upon expiration of the timer. Furthermore, in an aspect, block 410 may be performed by message transmitting component 314 of FIG. 3

Turning to FIG. 5, as introduced above, methodology 500 of FIG. 5 may include aspects of methodology 400 of FIG. 4 and may include additional and/or alternative aspects. For example, like methodology 400 of FIG. 4, methodology 500 may include, at block 502, initiating a call on a first subscription of a UE. Again, in an aspect of the present disclosure, block 502 may be performed by call initiating component 300 of FIG. 3.

In addition, at block 504, methodology 500 may include generating, during the call, a message for transmission to a network entity associated with a second subscription of the UE. In an aspect, block 504 may be performed by message generating component 302 of FIG. 3.

In addition, at block 506, methodology 500 may include starting a timer upon receiving the message at a transmission buffer of the UE. In some examples, a single timer may be started at block 506 when an initial, or first in time, message is received at the transmission buffer. Alternatively, a plurality of timers may be started at block 506, where each of the plurality of timers corresponds to an individual message received at the transmission buffer. In other words, the initial message may trigger the starting of a single timer, and any messages received at the transmission buffer after the initial message may be queued in the transmission buffer and transmitted during an inactivity gap or after the timer expires. Alternatively, each message of the plurality of messages may trigger an individual timer, and each of the plurality of timers may be maintained by radio resource manager 106.

After block 508, methodology 500 may proceed to block 510, and may include determining whether an inactivity gap exists in the call. In an aspect, determining that an inactivity gap exists in the call may include determining that no call data (or an amount of call data below a threshold value) is scheduled to be transmitted or is received. In some examples, block 510 may be performed by inactivity gap determining component 316 of FIG. 3.

Where it is determined at block 510 that an inactivity gap exists in the call, methodology 500 may proceed to block 512, where one or more messages may be transmitted to network entity 512. For example, where the messages are associated with second subscription 120, block 510 may include transmitting one or more messages 130 to second subscription network entity 124 of FIG. 1. In an aspect, block 512 may be performed by message transmitting component 314.

Furthermore, as the UE 102 may be configured to transmit a plurality of messages 130 queued in the transmission buffer 114 during any give inactivity gap, methodology 500 may include, at block 514, determining whether an inactivity gap is complete. In an aspect, block 514 may include determining that call data is queued for transmission and/or call data has been received. Where it is determined that the inactivity gap is not complete at block 514, methodology 500 may return to block 512, where the UE 102 may continue to transmit any queued messages to the network entity. Alternatively, where it is determined that the inactivity gap is complete at block 514, the radio resource may be handed over to the first subscription to continue the call, and the methodology 500 may return to block 510 during the call in order to determine whether a subsequent inactivity gap exists in the call during the time period associated with the timer that was started at block 508.

Turning again to block 510, where it is determined that an inactivity gap does not exist, methodology 500 may proceed to block 516. At block 516, methodology 500 may include determining whether the timer has expired. In some examples, block 516 may be performed by radio resource manager 106. Where the timer has not expired, methodology 500 may return to block 510, where the UE 102 may resume determining whether an inactivity gap exists during the call.

Alternatively, where it is determined at block 516 that the timer has expired, methodology 516 may proceed to block 518, where the UE 102 may transmit any messages remaining in transmission buffer 114 (i.e., those messages not transmitted during any inactivity gaps at block 512) to the network entity. In an aspect, block 518 may be performed by message transmitting component 314 of FIG. 3.

Figure 6:
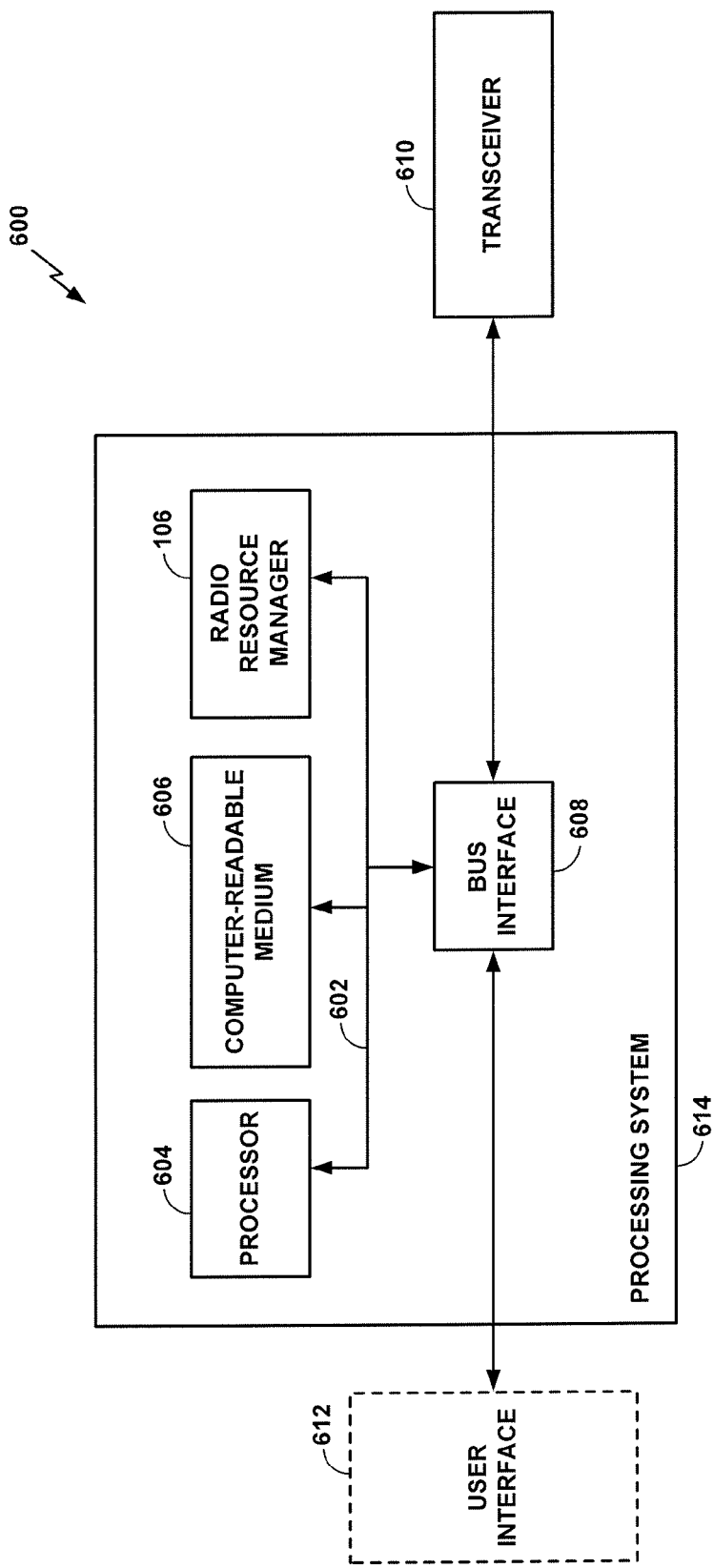
FIG. 6 is a diagram illustrating an example of a hardware implementation for an apparatus employing a processing system.

FIG. 6 is a conceptual diagram illustrating an example of a hardware implementation for an apparatus 600 employing a processing system 614. In some examples, the processing system 614 may comprise a UE or a component of a UE (e.g., UE 102 of FIG. 1). In this example, the processing system 614 may be implemented with a bus architecture, represented generally by the bus 602. The bus 602 may include any number of interconnecting buses and bridges depending on the specific application of the processing system 614 and the overall design constraints. The bus 602 links together various circuits including one or more processors, represented generally by the processor 604, computer-readable media, represented generally by the computer-readable medium 606, and an radio resource manager 106 (see FIGS. 1 and 3), which may be configured to carry out one or more methods or procedures described herein along with any sub-components of radio resource manager 106 (e.g., the components of radio resource manager 106 described in reference to FIG. 3, above).

The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a means for communicating with various other apparatus over a transmission medium. Depending upon the nature of the apparatus, a user interface 612 (e.g., keypad, display, speaker, microphone, joystick) may also be provided.

The processor 604 is responsible for managing the bus 602 and general processing, including the execution of software stored on the computer-readable medium 606. The software, when executed by the processor 604, causes the processing system 614 to perform the various functions described infra for any particular apparatus. The computer-readable medium 606 may also be used for storing data that is manipulated by the processor 604 when executing software. Furthermore, in some examples, radio resource manager 106 may be implemented as hardware, software, or a combination of hardware and software in the processing system 614. For example, computer-readable medium 606 may include instructions that, when executed by processor 604, may perform one or more of the aspects of radio resource manager 106 described herein. In addition, the components of radio resource manager 106 presented in FIGS. 1 and 3 may likewise be implemented as hardware, software, or a combination of hardware and software in the processing system 614.

Figure 7:
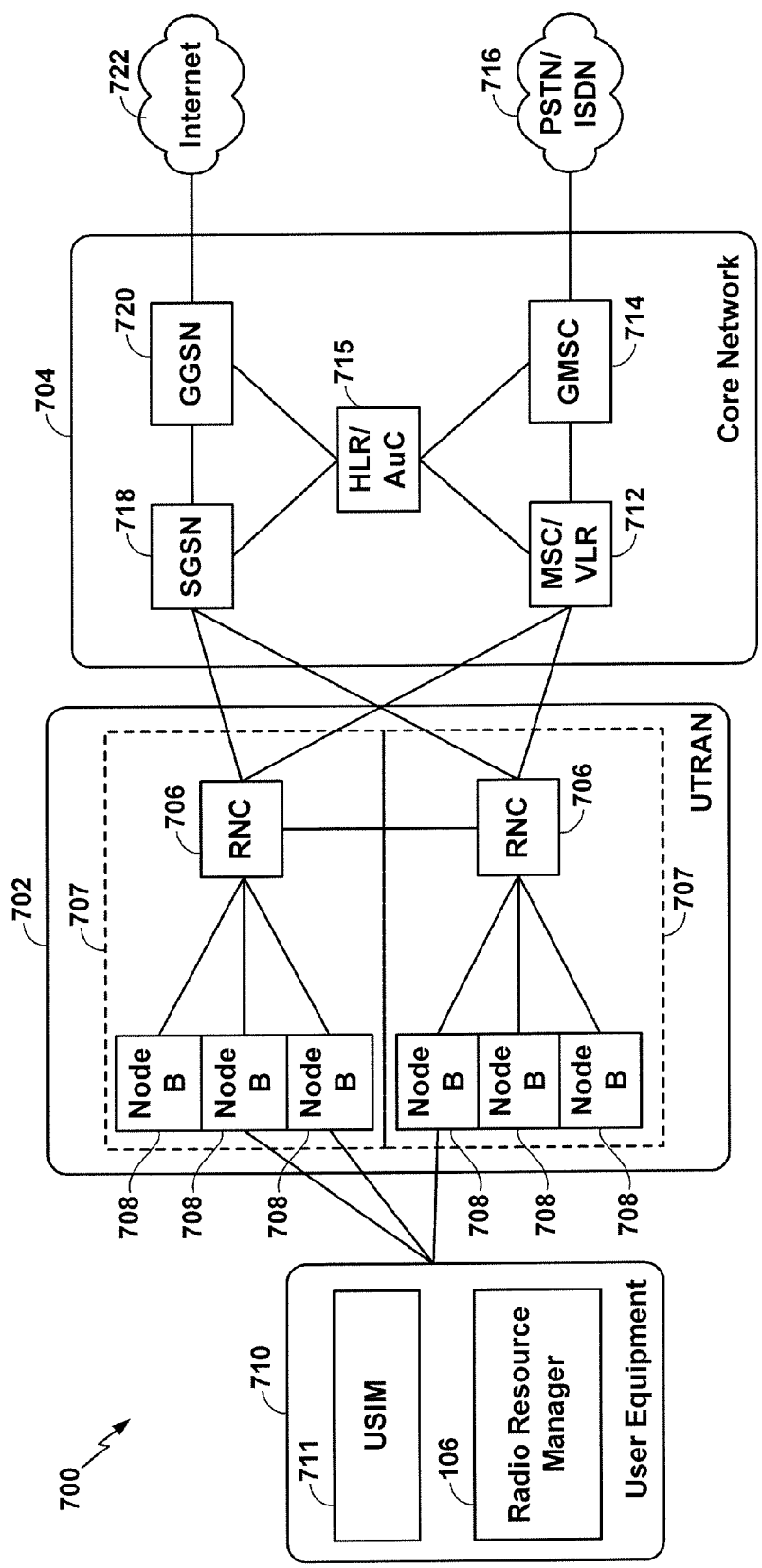
FIG. 7 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 7 are presented with reference to a UMTS system 700 employing a W-CDMA air interface. A UMTS network includes three interacting domains: a Core Network (CN) 704, a UMTS Terrestrial Radio Access Network (UTRAN) 702, and UE 710 (which may be UE 102 of FIG. 1 having radio resource manager 106). In this example, the UTRAN 702 provides various wireless services including telephony, video, data, messaging, broadcasts, and/or other services. The UTRAN 702 may include a plurality of Radio Network Subsystems (RNSs) such as an RNS 707, each controlled by a respective Radio Network Controller (RNC) such as an RNC 706. Here, the UTRAN 702 may include any number of RNCs 706 and RNSs 707 in addition to the RNCs 706 and RNSs 707 illustrated herein. The RNC 706 is an apparatus responsible for, among other things, assigning, reconfiguring and releasing radio resources within the RNS 707. The RNC 706 may be interconnected to other RNCs (not shown) in the UTRAN 702 through various types of interfaces such as a direct physical connection, a virtual network, or the like, using any suitable transport network.

Communication between a UE 710 and a Node B 708 (which may be either of first subscription network entity 104 and/or second subscription network entity 124 of FIG. 1) may be considered as including a physical (PHY) layer and a medium access control (MAC) layer. Further, communication between a UE 710 and an RNC 706 by way of a respective Node B 708 may be considered as including a radio resource control (RRC) layer. In the instant specification, the PHY layer may be considered layer 1; the MAC layer may be considered layer 2; and the RRC layer may be considered layer 3. In an aspect, the RRC layer may comprise the UE RRC layer of FIG. 2A. Information hereinbelow utilizes terminology introduced in Radio Resource Control (RRC) Protocol Specification, 3GPP TS 25.331 v9.1.0, incorporated herein by reference.

The geographic region covered by the SRNS 707 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 708 are shown in each SRNS 707; however, the SRNSs 707 may include any number of wireless Node Bs. The Node Bs 708 provide wireless access points to a core network (CN) 704 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 710 may further include a universal subscriber identity module (USIM) 711, which contains a user's subscription information to a network. In an aspect, UE 710 may be a multi-SIM device and may include a radio resource manager 106 as described in relation to at least FIGS. 1 and 3, above, and which may be configured to implement methodologies 400 and 500 described above in relation to FIGS. 4 and 5. For illustrative purposes, one UE 710 is shown in communication with a number of the Node Bs 708. The downlink (DL), also called the forward link, refers to the communication link from a Node B 708 to a UE 710, and the uplink (UL), also called the reverse link, refers to the communication link from a UE 710 to a Node B 708.

The core network 704 interfaces with one or more access networks, such as the UTRAN 702. As shown, the core network 704 is a GSM core network. However, as those skilled in the art will recognize, the various concepts presented throughout this disclosure may be implemented in a RAN, or other suitable access network, to provide UEs with access to types of core networks other than GSM networks.

The core network 704 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 704 supports circuit-switched services with a MSC 712 and a GMSC 714. In some applications, the GMSC 714 may be referred to as a media gateway (MGW). One or more RNCs, such as the RNC 706, may be connected to the MSC 712. The MSC 712 is an apparatus that controls call setup, call routing, and UE mobility functions. The MSC 712 also includes a visitor location register (VLR) that contains subscriber-related information for the duration that a UE is in the coverage area of the MSC 712. The GMSC 714 provides a gateway through the MSC 712 for the UE to access a circuit-switched network 716. The core network 704 includes a home location register (HLR) 715 containing subscriber data, such as the data reflecting the details of the services to which a particular user has subscribed. The HLR is also associated with an authentication center (AuC) that contains subscriber-specific authentication data. When a call is received for a particular UE, the GMSC 714 queries the HLR 715 to determine the UE's location and forwards the call to the particular MSC serving that location.

The core network 704 also supports packet-data services with a serving GPRS support node (SGSN) 718 and a gateway GPRS support node (GGSN) 720. GPRS, which stands for General Packet Radio Service, is designed to provide packet-data services at speeds higher than those available with standard circuit-switched data services. The GGSN 720 provides a connection for the UTRAN 702 to a packet-based network 722. The packet-based network 722 may be the Internet, a private data network, or some other suitable packet-based network. The primary function of the GGSN 720 is to provide the UEs 710 with packet-based network connectivity. Data packets may be transferred between the GGSN 720 and the UEs 710 through the SGSN 718, which performs primarily the same functions in the packet-based domain as the MSC 712 performs in the circuit-switched domain.

The UMTS air interface is a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such direct sequence spread spectrum technology and additionally calls for a frequency division duplexing (FDD). FDD uses a different carrier frequency for the uplink (UL) and downlink (DL) between a Node B 708 and a UE 710. Another air interface for UMTS that utilizes DS-CDMA, and uses time division duplexing, is the TD-SCDMA air interface. Those skilled in the art will recognize that although various examples described herein may refer to a WCDMA air interface, the underlying principles are equally applicable to a TD-SCDMA air interface.

Figure 8:
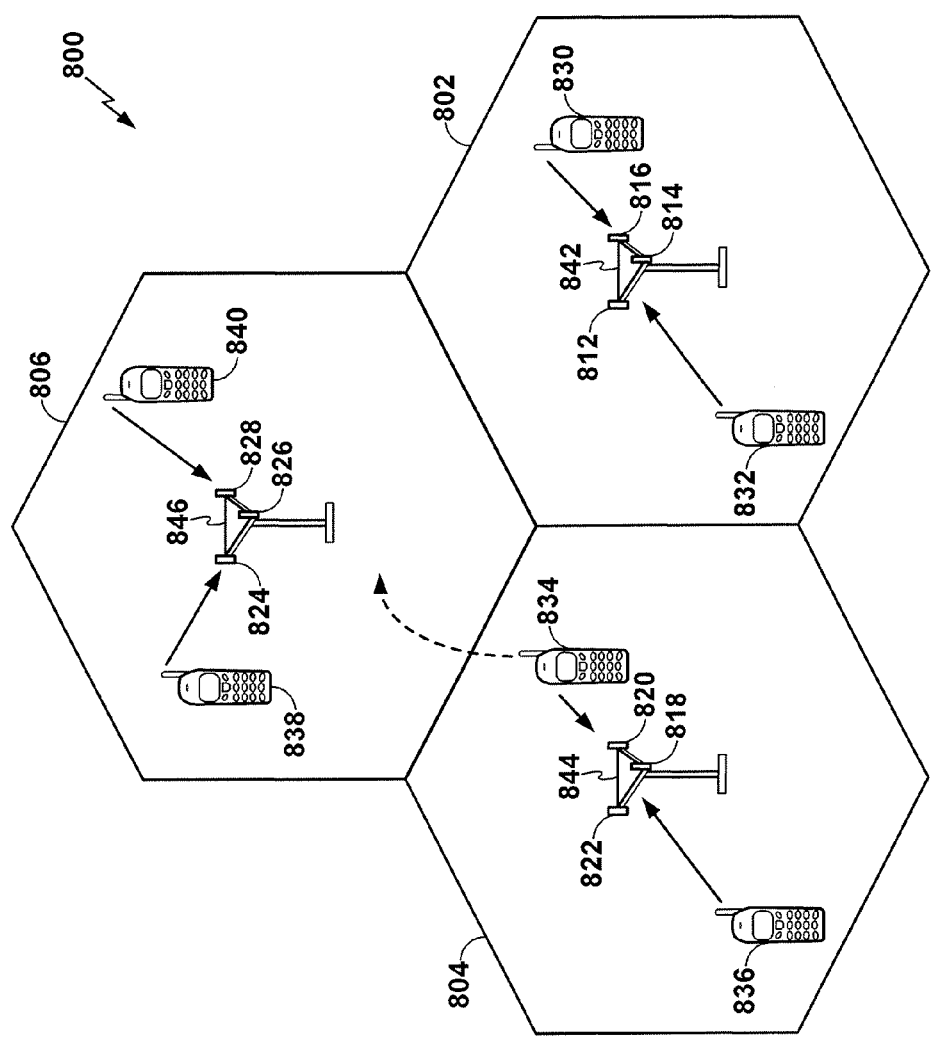
FIG. 8 is a conceptual diagram illustrating an example of an access network.

Referring to FIG. 8, an access network 800 in a UTRAN architecture is illustrated. In an example aspect, the UTRAN architecture may be associated with a network of a primary and/or secondary subscription of UE 102 where UE 102 comprises a multi-SIM device. The multiple access wireless communication system includes multiple cellular regions (cells), including cells 802, 804, and 806, each of which may include one or more sectors. The multiple sectors can be formed by groups of antennas with each antenna responsible for communication with UEs in a portion of the cell. For example, in cell 802, antenna groups 812, 814, and 816 may each correspond to a different sector. In cell 804, antenna groups 818, 820, and 822 each correspond to a different sector. In cell 806, antenna groups 824, 826, and 828 each correspond to a different sector. The cells 802, 804 and 806 may include several wireless communication devices, e.g., User Equipment or UEs, which may be in communication with one or more sectors of each cell 802, 804 or 806. For example, UEs 830 and 832 may be in communication with Node B 842, UEs 834 and 836 may be in communication with Node B 844, and UEs 838 and 840 (which may represent UE 102 of FIG. 1) can be in communication with Node B 846 (which may represent first subscription network entity and/or second subscription network entity 124 of FIG. 1). Here, each Node B 842, 844, 846 is configured to provide an access point to a core network 204 (see FIG. 7) for all the UEs 830, 832, 834, 836, 838, 840 in the respective cells 802, 804, and 806. In an aspect, each of the UEs presented in FIG. 8 may comprise UE 102 of FIG. 1 and may include a radio resource manager 106 such as the ones of FIGS. 1 and 3.

As the UE 834 moves from the illustrated location in cell 804 into cell 806, a serving cell change (SCC) or handover may occur in which communication with the UE 834 transitions from the cell 804, which may be referred to as the source cell, to cell 806, which may be referred to as the target cell. Management of the handover procedure may take place at the UE 834, at the Node Bs corresponding to the respective cells, at a radio network controller 506 (see FIG. 7), or at another suitable node in the wireless network. For example, during a call with the source cell 804, or at any other time, the UE 834 may monitor various parameters of the source cell 804 as well as various parameters of neighboring cells such as cells 806 and 802. Further, depending on the quality of these parameters, the UE 834 may maintain communication with one or more of the neighboring cells. During this time, the UE 834 may maintain an Active Set, that is, a list of cells that the UE 834 is simultaneously connected to (i.e., the UTRA cells that are currently assigning a downlink dedicated physical channel DPCH or fractional downlink dedicated physical channel F-DPCH to the UE 834 may constitute the Active Set).

The modulation and multiple access scheme employed by the access network 800 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 9:
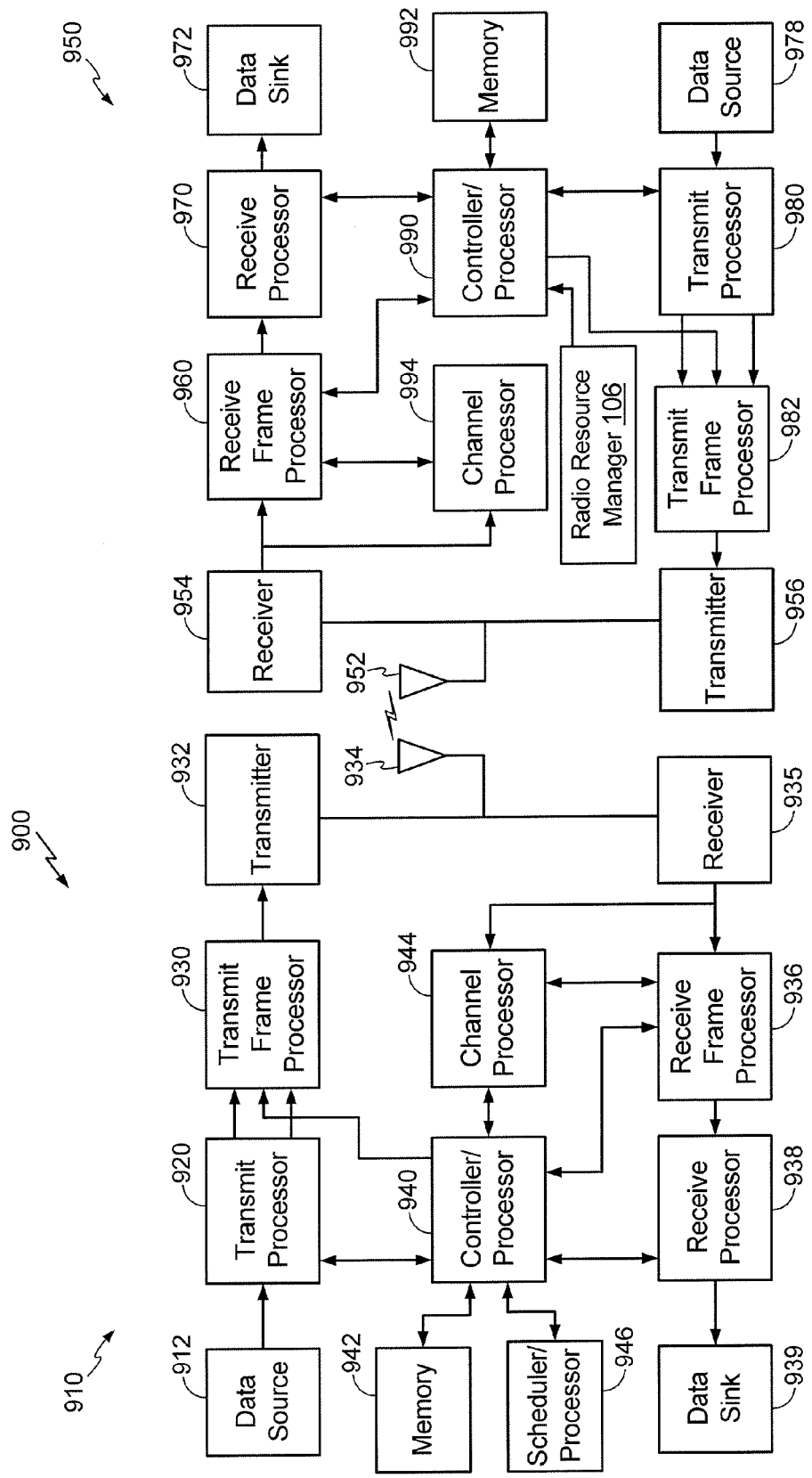
FIG. 9 is a block diagram conceptually illustrating an example of a Node B in communication with a UE in a telecommunications system.

FIG. 9 is a block diagram of a Node B 910 in communication with a UE 950, where the Node B 910 may be the first subscription network entity 104 or the second subscription network entity 124 of FIG. 1, and the UE 950 may be the UE 102 of FIG. 1. For example, UE 950 may be a multi-SIM device, may include radio resource manager 106, and may be configured to perform the functions associated with radio resource manager 106 presented throughout the present disclosure. In the downlink communication, a transmit processor 920 may receive data from a data source 912 and control signals from a controller/processor 940. The transmit processor 920 provides various signal processing functions for the data and control signals, as well as reference signals (e.g., pilot signals). For example, the transmit processor 920 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 944 may be used by a controller/processor 940 to determine the coding, modulation, spreading, and/or scrambling schemes for the transmit processor 920. These channel estimates may be derived from a reference signal transmitted by the UE 950 or from feedback from the UE 950. The symbols generated by the transmit processor 920 are provided to a transmit frame processor 930 to create a frame structure. The transmit frame processor 930 creates this frame structure by multiplexing the symbols with information from the controller/processor 940, resulting in a series of frames. The frames are then provided to a transmitter 932, which provides various signal conditioning functions including amplifying, filtering, and modulating the frames onto a carrier for downlink transmission over the wireless medium through antenna 934. The antenna 934 may include one or more antennas, for example, including beam steering bidirectional adaptive antenna arrays or other similar beam technologies.

At the UE 950, a receiver 954 receives the downlink transmission through an antenna 952 and processes the transmission to recover the information modulated onto the carrier. The information recovered by the receiver 954 is provided to a receive frame processor 960, which parses each frame, and provides information from the frames to a channel processor 994 and the data, control, and reference signals to a receive processor 970. The receive processor 970 then performs the inverse of the processing performed by the transmit processor 920 in the Node B 910. More specifically, the receive processor 970 descrambles and despreads the symbols, and then determines the most likely signal constellation points transmitted by the Node B 910 based on the modulation scheme. These soft decisions may be based on channel estimates computed by the channel processor 994. The soft decisions are then decoded and deinterleaved to recover the data, control, and reference signals. The CRC codes are then checked to determine whether the frames were successfully decoded. The data carried by the successfully decoded frames will then be provided to a data sink 972, which represents applications running in the UE 950 and/or various user interfaces (e.g., display). Control signals carried by successfully decoded frames will be provided to a controller/processor 990. When frames are unsuccessfully decoded by the receiver processor 970, the controller/processor 990 may also use an acknowledgement (ACK) and/or negative acknowledgement (NACK) protocol to support retransmission requests for those frames.

In the uplink, data from a data source 978 and control signals from the controller/processor 990 are provided to a transmit processor 980. The data source 978 may represent applications running in the UE 950 and various user interfaces (e.g., keyboard). Similar to the functionality described in connection with the downlink transmission by the Node B 910, the transmit processor 980 provides various signal processing functions including CRC codes, coding and interleaving to facilitate FEC, mapping to signal constellations, spreading with OVSFs, and scrambling to produce a series of symbols. Channel estimates, derived by the channel processor 994 from a reference signal transmitted by the Node B 910 or from feedback contained in the midamble transmitted by the Node B 910, may be used to select the appropriate coding, modulation, spreading, and/or scrambling schemes. The symbols produced by the transmit processor 980 will be provided to a transmit frame processor 982 to create a frame structure. The transmit frame processor 982 creates this frame structure by multiplexing the symbols with information from the controller/processor 990, resulting in a series of frames. The frames are then provided to a transmitter 956, which provides various signal conditioning functions including amplification, filtering, and modulating the frames onto a carrier for uplink transmission over the wireless medium through the antenna 952.

The uplink transmission is processed at the Node B 910 in a manner similar to that described in connection with the receiver function at the UE 950. A receiver 935 receives the uplink transmission through the antenna 934 and processes the transmission to recover the information modulated onto the carrier. The information recovered by the receiver 935 is provided to a receive frame processor 936, which parses each frame, and provides information from the frames to the channel processor 944 and the data, control, and reference signals to a receive processor 938. The receive processor 938 performs the inverse of the processing performed by the transmit processor 980 in the UE 950. The data and control signals carried by the successfully decoded frames may then be provided to a data sink 939 and the controller/processor, respectively. If some of the frames were unsuccessfully decoded by the receive processor, the controller/processor 940 may also use an acknowledgement (ACK) and/or negative acknowledgement (NACK) protocol to support retransmission requests for those frames.

The controller/processors 940 and 990 may be used to direct the operation at the Node B 910 and the UE 950, respectively. For example, the controller/processors 940 and 990 may provide various functions including timing, peripheral interfaces, voltage regulation, power management, and other control functions. The computer readable media of memories 942 and 992 may store data and software for the Node B 910 and the UE 950, respectively. A scheduler/processor 946 at the Node B 910 may be used to allocate resources to the UEs and schedule downlink and/or uplink transmissions for the UEs.

Figure 10:
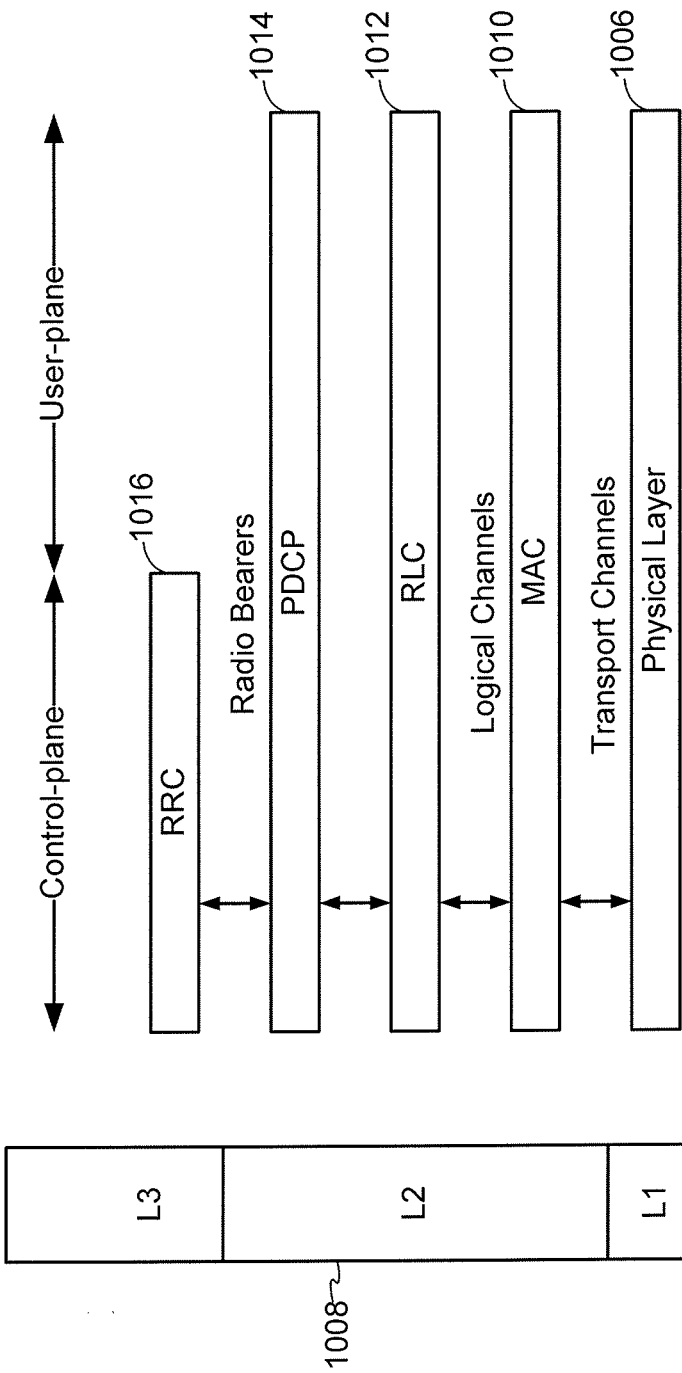
FIG. 10 is a conceptual diagram illustrating an example of a radio protocol architecture for the user and control plane that may be utilized in a user equipment and/or network entity of the present disclosure.

Turning to FIG. 10, the radio protocol architecture for a UE (e.g., UE 102 of FIG. 1) and a network entity (e.g., first subscription network entity 104 and/or second subscription network entity 124 of FIG. 1) is shown with three logical layers: Layer 1, Layer 2, and Layer 3. Layer 1 is the lowest lower and implements various physical layer signal processing functions. Layer 1 will be referred to herein as the physical layer 1006. Layer 2 (L2 layer) 1008 is above the physical layer 1006 and is responsible for the link between the UE and network entity over the physical layer 1006.

In the user plane, the L2 layer 1008 includes a media access control (MAC) sublayer 1010, a radio link control (RLC) sublayer 1012, and a packet data convergence protocol (PDCP) 1014 sublayer, which are terminated at the network entity on the network side. Although not shown, the UE may have several upper layers above the L2 layer 1008 including a network layer (e.g., IP layer) that is terminated at a PDN gateway on the network side, and an application layer that is terminated at the other end of the connection (e.g., far end UE, server, etc.).

The PDCP sublayer 1014 provides multiplexing between different radio bearers and logical channels. The PDCP sublayer 1014 also provides header compression for upper layer data packets to reduce radio transmission overhead, security by ciphering the data packets, and handover support for UEs between network entities. The RLC sublayer 1012 provides segmentation and reassembly of upper layer data packets, retransmission of lost data packets, and reordering of data packets to compensate for out-of-order reception due to hybrid automatic repeat request (HARQ). The MAC sublayer 1010 provides multiplexing between logical and transport channels. The MAC sublayer 1010 is also responsible for allocating the various radio resources (e.g., resource blocks) in one cell among the UEs. The MAC sublayer 1010 is also responsible for HARQ operations.

Several aspects of a telecommunications system have been presented with reference to an HSPA system. As those skilled in the art will readily appreciate, various aspects described throughout this disclosure may be extended to other telecommunication systems, network architectures and communication standards.

By way of example, various aspects may be extended to other UMTS systems such as W-CDMA, TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods or methodologies described herein may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, or 35 U.S.C. §112(f), whichever is appropriate, unless the element is expressly recited using the phrase "means for" or, in the case of a method claim, the element is recited using the phrase "step for."

We claim:

1. A method of controlling access to a radio resource of a multi-subscriber identity module (SIM) user equipment (UE), comprising:
   initiating a call on a first subscription of the UE;
   generating, during the call, a message for transmission to a network entity associated with a second subscription of the UE;
   starting a timer upon receiving the response at a transmission buffer of the UE;
   determining, upon expiration of the timer, that the message is at the transmission buffer pending transmission to the network entity; and
   transmitting the message based at least in part on determining that the message is pending transmission upon expiration of the timer.

2. The method of claim 1, further comprising receiving a signaling message associated with the second subscription from the network entity during the call, and wherein the message comprises a response to the signaling message.

3. The method of claim 1, further comprising determining to initiate a packet-switched (PS) call on the second subscription, and wherein the message comprises a PS call establishment message.

4. The method of claim 1, wherein the message comprises a measurement report.

5. The method of claim 1, further comprising:
   determining that an inactivity gap exists during the call; and
   transmitting the message based at least in part on determining that the inactivity gap exists.

6. The method of claim 5, further comprising setting a highest priority to the second subscription for access to a radio resource, wherein the setting is based on determining that the inactivity gap exists during the call.

7. The method of claim 1, further comprising setting a highest priority to the second subscription for access to a radio resource upon expiration of the timer.

8. The method of claim 1, further comprising setting a time duration associated with the timer, wherein the time duration is based on whether a procedure type corresponding to the message is timing critical or non-timing critical.

9. The method of claim 8, wherein the procedure type is timing critical where a target state associated with the procedure type is a CELL_DCH state.

10. The method of claim 8, wherein the procedure type is timing critical where the message comprises a random access channel (RACH) message.

11. The method of claim 1, further comprising setting a time duration associated with the timer based on one or more timing requirements associated with the first subscription.

12. The method of claim 1, wherein generating the message comprises generating the message at a radio resource control (RRC) layer entity.

13. The method of claim 12, further comprising sending, by the RRC layer entity, the message to the transmission buffer.

14. A multi-subscriber identity module (SIM) user equipment (UE), comprising:
- means for initiating a call on a first subscription of the UE;
- means for generating, during the call, a message for transmission to a network entity associated with a second subscription of the UE;
- means for starting a timer upon receiving the response at a transmission buffer of the UE;
- means for determining, upon expiration of the timer, that the message is at the transmission buffer pending transmission to the network entity; and
- means for transmitting the message based at least in part on determining that the message is pending transmission upon expiration of the timer.

15. The multi-SIM UE of claim 14, further comprising means for setting a time duration associated with the timer, wherein the time duration is based on whether a procedure type corresponding to the message is timing critical or non-timing critical.

16. A non-transitory computer-readable storage medium storing computer executable code, comprising:
- code to initiate a call on a first subscription of a multi-subscriber identity module (SIM) user equipment (UE);
- code to generate, during the call, a message for transmission to a network entity associated with a second subscription of the UE;
- code to start a timer upon receiving the response at a transmission buffer of the UE;
- code to determine, upon expiration of the timer, that the message is at the transmission buffer pending transmission to the network entity; and
- code to transmit the message based at least in part on determining that the message is pending transmission upon expiration of the timer.

17. The non-transitory computer-readable storage medium of claim 16, wherein the computer executable code comprises code to set a time duration associated with the timer, wherein the time duration is based on whether a procedure type corresponding to the message is timing critical or non-timing critical.

18. A multi-subscriber identity module (SIM) user equipment (UE), comprising:
- a call initiating component configured to initiate a call on a first subscription of the UE;
- a message generating component configured to generate, during the call, a message for transmission to a network entity associated with a second subscription of the UE;
- a timer starting component configured to start a timer upon receiving the message at a transmission buffer of the UE;
- a pending message determining component configured to determine, upon expiration of the timer, that the message is at the transmission buffer pending transmission to the network entity; and
- a message transmitting component configured to transmit the message based at least in part on determining that the message is pending transmission upon expiration of the timer.

19. The multi-SIM UE of claim 18, further comprising a radio resource for receiving a signaling message associated with the second subscription from the network entity during the call, and wherein the message comprises a response to the signaling message.

20. The multi-SIM UE of claim 18, wherein the call initiating component is configured to determine to initiate a packet-switched (PS) call on the second subscription, and wherein the message comprises a PS call establishment message.

21. The multi-SIM UE of claim 18, wherein the message comprises a measurement report.

22. The multi-SIM UE of claim 18, further comprising an inactivity gap determining component configured to determine that an inactivity gap exists during the call, and wherein the message transmitting component is further configured to transmit the message based at least in part on the inactivity gap determining component determining that the inactivity gap exists.

23. The multi-SIM UE of claim 22, further comprising a radio resource subscription priority setting component configured to set a highest priority to the second subscription for access to a radio resource, wherein the setting is based on determining that the inactivity gap exists during the call.

24. The multi-SIM UE of claim 18, further comprising a radio resource subscription priority setting component configured to set a highest priority to the second subscription for access to a radio resource upon expiration of the timer.

25. The multi-SIM UE of claim 18, further comprising a time duration setting component configured to set a time duration associated with the timer, wherein the time duration is based on whether a procedure type corresponding to the message is timing critical or non-timing critical.

26. The multi-SIM UE of claim 18, wherein the procedure type is timing critical where a target state associated with the procedure type is a CELL_DCH state.

27. The multi-SIM UE of claim 18, wherein the procedure type is timing critical where the message comprises a random access channel (RACH) message.

28. The multi-SIM UE of claim 18, further comprising a time duration setting component configured to set a time duration associated with the timer based on one or more timing requirements associated with the first subscription.

29. The multi-SIM UE of claim 18, wherein the message generating component is further configured to generate the message at a radio resource control (RRC) layer entity.

30. The multi-SIM UE of claim 18, further comprising an intra-UE message sending component configured to send, via the RRC layer entity, the message to the transmission buffer.

* * * * *